(12) United States Patent
Milstein et al.

(10) Patent No.: US 10,795,367 B2
(45) Date of Patent: Oct. 6, 2020

(54) MAPPED DRIVING PATHS FOR AUTONOMOUS VEHICLE

(71) Applicant: UATC, LLC, San Francisco, CA (US)

(72) Inventors: Adam Henry Polk Milstein, Pittsburgh, PA (US); Donald Jason Burnette, Mountain View, CA (US); Lisa Christine Weitekamp, Pittsburgh, PA (US); Bryan John Nagy, Allison Park, PA (US); Eric Michael Perko, Pittsburgh, PA (US)

(73) Assignee: UATC, LLC, San Francisco, CA (US)

(*) Notice: Subject to any disclaimer, the term of this patent is extended or adjusted under 35 U.S.C. 154(b) by 226 days.

(21) Appl. No.: 15/913,372

(22) Filed: Mar. 6, 2018

(65) Prior Publication Data
US 2019/0212744 A1    Jul. 11, 2019

Related U.S. Application Data

(60) Provisional application No. 62/616,114, filed on Jan. 11, 2018.

(51) Int. Cl.
*G05D 1/02* (2020.01)
*B60W 40/02* (2006.01)
*G08G 1/07* (2006.01)

(52) U.S. Cl.
CPC ........... *G05D 1/0212* (2013.01); *B60W 40/02* (2013.01); *G05D 1/0217* (2013.01); *G05D 1/0231* (2013.01); *G05D 1/0274* (2013.01); *G08G 1/07* (2013.01); *G05D 2201/0213* (2013.01)

(58) Field of Classification Search
CPC .. B60W 60/0015; B60W 30/10; B60W 30/16; B60W 40/02; B60W 2552/00; B60W 2556/50; G08G 1/07; G05D 1/0274; G05D 1/0217; G05D 1/0231; G05D 1/0212
See application file for complete search history.

(56) References Cited

U.S. PATENT DOCUMENTS

| | | | |
|---|---|---|---|
| 10,514,696 B2* | 12/2019 | Conor ................ | G05D 1/0088 |
| 2015/0296707 A1* | 10/2015 | Fukuda ................ | A01D 34/008 |
| | | | 701/25 |
| 2017/0329347 A1* | 11/2017 | Passot ................ | A47L 11/4011 |
| 2018/0120859 A1* | 5/2018 | Eagelberg ........... | G06K 9/00805 |
| 2018/0244275 A1* | 8/2018 | Bremkens ............ | B60W 50/14 |
| 2018/0346140 A1* | 12/2018 | Clemente ............ | B64C 37/02 |

(Continued)

*Primary Examiner* — Mussa A Shaawat
(74) *Attorney, Agent, or Firm* — Schwegman Lundberg & Woessner, P.A.

(57) ABSTRACT

A method for receiving autonomous vehicle (AV) driving path data associated with a driving path in a roadway of a geographic location. The driving path data associated with a trajectory for an AV in a roadway and trajectory points in a trajectory of the driving path in the roadway for determining at least one feature of the roadway positioned a lateral distance from a first trajectory of the one or more trajectories of the driving path of an AV based on the map data. The method includes receiving map data associated with a map of a geographic location, determining a driving path for an AV in a roadway, generating driving path information based on a trajectory point in a trajectory of the driving path, and providing driving path data associated with the driving path to an AV for controlling the AV on the roadway.

16 Claims, 11 Drawing Sheets

(56) References Cited

U.S. PATENT DOCUMENTS

| | | | |
|---|---|---|---|
| 2019/0017836 A1* | 1/2019 | Tuukkanen | G01C 21/3492 |
| 2019/0072978 A1* | 3/2019 | Levi | G06T 17/05 |
| 2019/0120639 A1* | 4/2019 | Song | G01C 21/3423 |
| 2019/0126930 A1* | 5/2019 | Kim | B60W 40/06 |
| 2019/0187239 A1* | 6/2019 | O'Brien | G01S 5/16 |
| 2019/0235516 A1* | 8/2019 | Zhang | G05D 1/0088 |
| 2019/0276016 A1* | 9/2019 | Giorelli | B60W 30/10 |
| 2019/0317511 A1* | 10/2019 | Xu | G05D 1/0088 |
| 2019/0355257 A1* | 11/2019 | Caldwell | G08G 1/166 |
| 2020/0007661 A1* | 1/2020 | Kim | G08G 1/0116 |

\* cited by examiner

MAPPED DRIVING PATHS FOR AUTONOMOUS VEHICLE

CROSS REFERENCE TO RELATED APPLICATION

This application claims the benefit of U.S. Provisional Application No. 62/616,114, filed Jan. 11, 2018 the entire disclosure of which is hereby incorporated by reference in its entirety.

BACKGROUND

An autonomous vehicle (AV) (e.g., a driverless car, a driverless auto, a self-driving car, a robotic car, etc.) is a vehicle that is capable of sensing an environment of the vehicle and traveling (e.g., navigating, moving, etc.) in the environment without human input. An AV uses a variety of techniques to detect the environment of the AV, such as radar, laser light, Global Positioning System (GPS), odometry, and/or computer vision. In some instances, an AV uses a control system to interpret information received from one or more sensors, to identify a route for traveling, to identify an obstacle in a route, and to identify relevant traffic signs associated with a route.

SUMMARY

According to some non-limiting embodiments or aspects, provided is a computer-implemented method for determination of at least one driving path including: receiving, with a computer system comprising one or more processors, map data associated with a map of a geographic location, wherein the map data is associated with a roadway in the geographic location; determining, with the computing system, a driving path including one or more trajectories for an autonomous vehicle (AV) in a roadway based on one or more traversals of the roadway by one or more vehicles; generating, with the computing system, driving path information based on one or more trajectory points in the one or more trajectories of the driving path in the roadway; and providing, with the computing system, the driving path data associated with the driving path to an AV for controlling the AV on the roadway.

In some non-limiting embodiments, the method, generating the driving path information further includes: determining at least one feature of the roadway positioned a lateral distance from a first trajectory of the one or more trajectories of the driving path based on the map data; and in response to determining the at least one feature of the roadway, determining a lateral constraint based on at least the lateral distance of the at least one feature of the roadway from the first trajectory, the lateral constraint associated with at least one lateral movement of an AV traversing the driving path on the roadway.

In some non-limiting embodiments or aspects, determining at least one feature of the roadway orthogonal to the driving path further includes: determining an interval for the driving path, the interval associated with selecting a first set of trajectory points in the first trajectory of the driving path; determining a lateral region in the roadway based on the map data associated with a location between a first set of edges of the first set of trajectory points, each edge of the first set of edges including an orthogonal projection from a point of the first set of trajectory points in the first trajectory; and generating feature information based on at least a portion of the at least one feature of the roadway having a location in the lateral region a lateral distance from the driving path.

In some non-limiting embodiments or aspects, determining a driving path further includes: identifying a primary path in the driving path, the primary path including a first trajectory of the one or more trajectories in the driving path, wherein the primary path satisfies a threshold indicating a driving path for controlling the AV in an autonomous mode.

In some non-limiting embodiments or aspects, the method further includes: identifying a secondary path in the driving path, the secondary path including a second trajectory of the one or more trajectories in the driving path, wherein the secondary path does not satisfy a threshold indicating a driving path for controlling the AV in an autonomous mode; linking the primary path to the secondary path, wherein the first trajectory in the primary path is linked to the second trajectory in the secondary path.

In some non-limiting embodiments or aspects, a heading and curvature associated with an entry of the secondary path matches the heading and curvature associated with an end of the primary path.

In some non-limiting embodiments or aspects, determining a driving path further includes: determining an end point of a first primary path that is not linked to a driving path; determining an entry point of a second primary path of the roadway associated with the end point of the first primary path that is not linked to a driving path; determining a heading at the end point of the first primary path in the driving path that matches a heading at the entry point of the second primary path; and linking the end point of the first primary path to the entry point of the second primary path.

In some non-limiting embodiments or aspects, the entry point of the driving path is associated with entry information for entering the primary path, the entry information comprising at least one of heading information, curvature information, and acceleration information of the driving path.

In some non-limiting embodiments or aspects, wherein the one or more trajectories of the driving path are associated with a spline, a polyline, or any combination thereof.

According to some non-limiting embodiments or aspects, a computing system includes: one or more processors configured to: receive map data associated with a map of a geographic location, wherein the map data is associated with a roadway in the geographic location; determine a driving path including one or more trajectories for an AV in a roadway based on one or more traversals of the roadway by one or more vehicles; generate driving path information based on one or more trajectory points in the one or more trajectories of the driving path in the roadway; and provide the driving path data associated with the driving path to an AV for controlling the AV on the roadway.

In some non-limiting embodiments or aspects, the one or more processors, when generating the driving path data, are further configured to: determine at least one feature of the roadway positioned a lateral distance from a first trajectory of the one or more trajectories of the driving path based on the map data; and in response to determining the at least one feature of the roadway, determine a lateral constraint based on at least the lateral distance of the at least one feature of the roadway from the first trajectory, the lateral constraint associated with at least one lateral movement of an AV traversing the driving path on the roadway.

In some non-limiting embodiments or aspects, the one or more processors when determining at least one feature of the roadway orthogonal to the driving path are further configured to: determine an interval for the driving path, the interval associated with selecting a first set of trajectory points in the first trajectory of the driving path; determine a lateral region in the roadway based on the map data associated with a location between a first set of edges of the first set of trajectory points, each edge of the set of edges including an orthogonal projection from a point of the first set of trajectory points in the first trajectory; and generate feature information based on at least a portion of the at least one feature of the roadway having a location in the lateral region a lateral distance from the driving path.

In some non-limiting embodiments or aspects, the one or more processors, when determining the driving path, further configured to: identify a primary path in the driving path, the primary path including a first trajectory of the one or more trajectories in the driving path, wherein the primary path satisfies a threshold indicating a driving path for controlling the AV in an autonomous mode.

In some non-limiting embodiments or aspects, the one or more processors further configured to: identify a secondary path in the driving path, the secondary path including a second trajectory of the one or more trajectories in the driving path, wherein the secondary path does not satisfy a threshold indicating a driving path for controlling the AV in an autonomous mode; and link the primary path to the secondary path, wherein the first trajectory in the primary path is linked to the second trajectory in the secondary path.

In some non-limiting embodiments or aspects, a heading and curvature associated with an entry of the secondary path matches the heading and curvature associated with an end of the primary path.

In some non-limiting embodiments or aspects, when determining the driving path, the one or more processors are further configured to: determine an end point of a first primary path that is not linked to a driving path; determine an entry point of a second primary path of the roadway associated with the end point of the first primary path that is not linked to a driving path; determine a heading at the end point of the first primary path in the driving path that matches a heading at the entry point of the second primary path; and link the end point of the first primary path to the entry point of the second primary path.

In some non-limiting embodiments or aspects, the entry point of the driving path is associated with entry information for entering the primary path, the entry information comprising at least one of heading information, curvature information, and acceleration information of the driving path.

In some non-limiting embodiments or aspects, the one or more trajectories of the driving path are associated with a spline, a polyline, or any combination thereof.

In some non-limiting embodiments or aspects, provided is an AV including a vehicle computing system including one or more processors, the vehicle computing system configured to: receive driving path data associated with a driving path in a roadway in a map of a geographic location, the driving path data including one or more trajectories that an AV can traverse in the roadway and an indication of the location of at least one feature in the roadway a lateral distance from the driving path; and determine a route including the driving path of the roadway in the geographic location based on the driving path data.

In some non-limiting embodiments or aspects, the AV further including: one or more sensors for detecting an object in an environment surrounding the AV, wherein the vehicle computing system is further configured to: control travel of the AV on at least a primary path of the driving path based on sensor data from the one or more sensors and the driving path data associated with the driving path.

In some non-limiting embodiments or aspects, the vehicle computing system is further configured to: detect, based on the one or more sensors, that an object is in the roadway on the route; determine a vehicle operation based on the driving path data including the indication of the location of the at least one feature in the roadway a lateral distance from the driving path; and control travel of the AV on at least a portion of the route based on sensor data from the one or more sensors and the driving path data associated with the driving path.

Further non-limiting embodiments or aspects are set forth in the following numbered clauses:

Clause 1. A computer-implemented method for determination of at least one driving path comprising: receiving, with a computer system comprising one or more processors, map data associated with a map of a geographic location, wherein the map data is associated with a roadway in the geographic location; determining, with the computing system, a driving path including one or more trajectories for an AV in the roadway based on one or more traversals of the roadway by one or more vehicles; generating, with the computing system, driving path information based on one or more trajectory points in the one or more trajectories of the driving path in the roadway; and providing, with the computing system, driving path data associated with the driving path to the AV for controlling the AV on the roadway.

Clause 2. The computer-implemented method of clause 1, wherein generating the driving path information further comprises: determining at least one feature of the roadway positioned a lateral distance from a first trajectory of the one or more trajectories of the driving path based on the map data; and in response to determining the at least one feature of the roadway, determining a lateral constraint based on at least the lateral distance of the at least one feature of the roadway from the first trajectory, the lateral constraint associated with at least one lateral movement of the AV traversing the driving path on the roadway.

Clause 3. The computer-implemented method of any of clauses 1 and 2, wherein determining at least one feature of the roadway orthogonal to the driving path comprises: determining an interval for the driving path, the interval associated with selecting a first set of trajectory points in the first trajectory of the driving path; determining a lateral region in the roadway based on the map data associated with a location between a first set of edges of the first set of trajectory points, each edge of the first set of edges including an orthogonal projection from a point of the first set of trajectory points in the first trajectory; and generating feature information based on at least a portion of the at least one feature of the roadway having a location in the lateral region a lateral distance from the driving path.

Clause 4. The computer-implemented method of any of clauses 1-3, wherein determining a driving path further comprises: identifying a primary path in the driving path, the primary path including a first trajectory of the one or more trajectories in the driving path, wherein the primary path satisfies a threshold indicating a driving path for controlling the AV in an autonomous mode.

Clause 5. The computer-implemented method of any of clauses 1-4, further comprising:

identifying a secondary path in the driving path, the secondary path including a second trajectory of the one or more trajectories in the driving path, wherein the secondary path does not satisfy a threshold indicating a driving path for controlling the AV in the autonomous mode; linking the primary path to the secondary path, wherein the first trajectory in the primary path is linked to the second trajectory in the secondary path.

Clause 6. The computer-implemented method of any of clauses 1-5, wherein a heading and a curvature associated with an entry of the secondary path matches a heading and a curvature associated with an end of the primary path.

Clause 7. The computer-implemented method of any of clauses 1-6, wherein determining a driving path further comprises: determining an end point of a first primary path that is not linked to a driving path; determining an entry point of a second primary path of the roadway associated with the end point of the first primary path that is not linked to a driving path; determining a heading at the end point of the first primary path in the driving path that matches a heading at the entry point of the second primary path; and linking the end point of the first primary path to the entry point of the second primary path.

Clause 8. The computer-implemented method of any of clauses 1-7, wherein the entry point of the driving path is associated with entry information for entering the primary path, the entry information comprising at least one of heading information, curvature information, and acceleration information of the driving path.

Clause 9. The computer-implemented method of any of clauses 1-8, wherein the one or more trajectories of the driving path are associated with a spline, a polyline, or any combination thereof.

Clause 10. A computing system comprising: one or more processors configured to: receive map data associated with a map of a geographic location, wherein the map data is associated with a roadway in the geographic location; determine a driving path including one or more trajectories for an AV in the roadway based on one or more traversals of the roadway by one or more vehicles; generate driving path information based on one or more trajectory points in the one or more trajectories of the driving path in the roadway; and provide the driving path data associated with the driving path to an AV for controlling the AV on the roadway.

Clause 11. The computing system of clause 10, wherein the one or more processors are further configured, when generating the driving path data, to: determine at least one feature of the roadway positioned a lateral distance from a first trajectory of the one or more trajectories of the driving path based on the map data; and in response to determining the at least one feature of the roadway, determine a lateral constraint based on at least the lateral distance of the at least one feature of the roadway from the first trajectory, the lateral constraint associated with at least one lateral movement of the AV traversing the driving path on the roadway.

Clause 12. The computing system of any of clauses 10 and 11, wherein the one or more processors are further configured when determining at least one feature of the roadway orthogonal to the driving path to: determine an interval for the driving path, the interval associated with selecting a first set of trajectory points in the first trajectory of the driving path; determine a lateral region in the roadway based on the map data associated with a location between a first set of edges of the first set of trajectory points, each edge of the set of edges including an orthogonal projection from a point of the first set of trajectory points in the first trajectory; and generate feature information based on at least a portion of the at least one feature of the roadway having a location in the lateral region a lateral distance from the driving path.

Clause 13. The computing system of any of clauses 10-12, when determining the driving path, further configured to: identify a primary path in the driving path, the primary path including a first trajectory of the one or more trajectories in the driving path, wherein the primary path satisfies a threshold indicating a driving path for controlling the AV in an autonomous mode.

Clause 14. The computing system of any of clauses 10-13, further configured to: identify a secondary path in the driving path, the secondary path including a second trajectory of the one or more trajectories in the driving path, wherein the secondary path does not satisfy a threshold indicating a driving path for controlling the AV in the autonomous mode; and link the primary path to the secondary path, wherein the first trajectory in the primary path is linked to the second trajectory in the secondary path.

Clause 15. The computing system of any of clauses 10-14, wherein a heading and a curvature associated with an entry of the secondary path matches a heading and a curvature associated with an end of the primary path.

Clause 16. The computing system of any of clauses 10-15, when determining the driving path, wherein the one or more processors are further configured to: determine an end point of a first primary path that is not linked to a driving path; determine an entry point of a second primary path of the roadway associated with the end point of the first primary path that is not linked to a driving path; determine a heading at the end point of the first primary path in the driving path that matches a heading at the entry point of the second primary path; and link the end point of the first primary path to the entry point of the second primary path.

Clause 17. The computing system of any of clauses 10-16, wherein the entry point of the driving path is associated with entry information for entering the primary path, the entry information comprising at least one of heading information, curvature information, and acceleration information of the driving path.

Clause 18. The computing system of any of clauses 10-17, wherein the one or more trajectories of the driving path are associated with a spline, a polyline, or any combination thereof.

Clause 19. An AV comprising: a vehicle computing system comprising one or more processors, wherein the vehicle computing system is configured to: receive driving path data associated with a driving path in a roadway in a map of a geographic location, the driving path data including one or more trajectories that the AV can traverse in the roadway and an indication of the location of at least one feature in the roadway a lateral distance from the driving path; and determine a route including the driving path of the roadway in the geographic location based on the driving path data associated with the driving path.

Clause 20. The AV of clause 19 further comprising: one or more sensors for detecting an object in an environment surrounding the AV, wherein the vehicle computing system is further configured to: control travel of the AV on a first trajectory of the one or more trajectories of the driving path based on sensor data from the one or more sensors and the driving path data associated with the driving path.

Clause 21. The AV of any of clauses 19 and 20 further comprising: one or more sensors for detecting an object in an environment surrounding the AV, wherein the vehicle computing system is further configured to: determine a vehicle operation based on the driving path data including the indication of the location of the at least one feature in the roadway a lateral distance from the driving path; and detect, based on the one or more sensors, that an object is in the roadway on the route; control travel of the AV on at least a portion of the route based on sensor data from the one or more sensors and the driving path data associated with the driving path.

DETAILED DESCRIPTION

Figure 1:
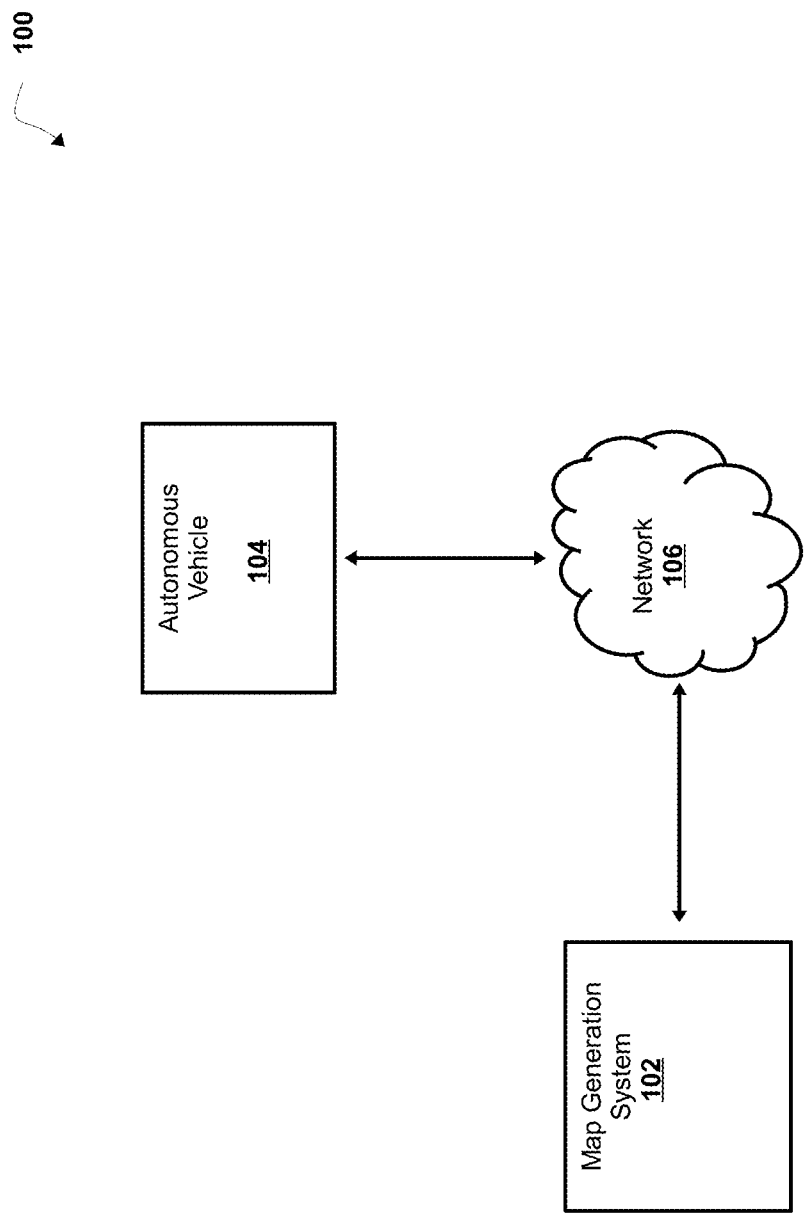
FIG. 1 is a diagram of a non-limiting embodiment of an environment in which systems and/or methods, described herein, can be implemented.

In some non-limiting embodiments, an autonomous vehicle (AV) map of a geographic location is used for determining nominal driving paths on lanes of roadways (e.g., roadway segments) in the map on which an AV may operate (e.g., route, travel, or perform one or more autonomous operations). For example, a nominal driving path including one or more lanes on one or more roadway segments is determined by generating a center line through lane boundaries of a lane.

However, a nominal driving path may not describe a proper driving path through lanes on roadway segments over which an AV can travel. For example, nominal driving paths may include inconsistencies associated with the lane boundaries of the roadway. As an example, a centerline of lane boundaries may provide inaccuracies for AV travel, based on different markings from a first lane to a second lane in a roadway where the width of the lane boundaries are determined. Additionally or alternatively, an AV of a first size may not operate on a nominal driving path, the same as an AV of a second size on the same nominal path. For example, a large sized AV may be limited (e.g., constrained) in movement as compared to a smaller sized AV when traversing a nominal driving path based on the lane boundaries in the roadway of the AV map. Additionally or alternatively, a nominal driving path may be inefficiently determined from aspects of a lane polygon that requires additional storage of points on the polygon and/or additional computations. In this way, a nominal driving path may be less complete and/or result in less efficient processing for operating and/or routing the AV. In addition, a map may be generated that provides an AV fewer operating options and/or driving options, may not account for the proper structure of lanes, and/or may implement additional processing functions to modify or augment the AV map for lanes with incomplete or incorrect physical markings.

As disclosed herein, in some non-limiting embodiments, a map generation system receives map data associated with a map of a geographic location, wherein the map data is associated with a roadway in the geographic location. The map generation system determines a driving path including one or more trajectories for an AV in a roadway based on one or more traversals of the roadway by one or more vehicles. The map generation system generates driving path information based on one or more trajectory points in the one or more trajectories of the driving path in the roadway. In this way, the map generation system provides and/or generates the driving path data associated with the driving path to an AV for controlling travel of the AV on the roadway. In this way, the map generation system determines a driving path in a roadway without a lane polygon. Alternatively and/or additionally, the map generation system may generate driving path information for controlling an AV while determining features in the roadway (e.g., section of curb, marker, object, other driving path, etc.) a lateral distance from a driving path in the roadway to the left and right of the AV. Accordingly, the map generation system generates a more complete driving path for AV routing, that enables more efficient processing for operating and/or routing the AV and provides more roadway options for routing the AV. In addition, the map generation system provides a driving path for an AV having substantially reduced or eliminated inconsistencies associated with the lane boundaries or features of a map.

As disclosed herein, in some non-limiting embodiments, a vehicle computing system of an AV receives driving path data associated with a driving path in a roadway in a map of a geographic location, the driving path data including one or more trajectories that an AV can traverse in the roadway and an indication of the location of at least one feature in the roadway a lateral distance from the driving path. The AV can determine a route including the driving path of the roadway in the geographic location, based on the driving path data. In this way, the driving path data enables an AV to travel on the roadway accurately and efficiently. For example, the vehicle computing system can determine at least one feature of the roadway in the driving path based on the map data. In some cases, the vehicle computing system can determine a lateral constraint associated with lateral movement on the roadway based on the driving path data associated with the trajectory. Accordingly, the map enables the vehicle computing system to generate and/or traverse a route in a more efficient manner with less processing delays and/or routing for the AV to be performed by the vehicle processing system (e.g., completely by the vehicle processing system).

In some non-limiting embodiments, the map generation system and/or the AV include one or more devices capable of receiving, storing, and/or providing map data associated with a map of a geographic location (e.g., a country, a state, a city, a portion of a city, a township, a portion of a township, etc.). For example, AV maps are used for routing an AV on a roadway specified in the AV maps. In some non-limiting embodiments, map data includes data associated with a road (e.g., an identity and/or a location of a roadway of a road, an identity and/or location of a segment of a road, etc.), data associated with features of a road, such as an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. In some non-limiting embodiments, a map of a geographic location includes one or more routes that include one or more roadways. In some non-limiting embodiments, map data associated with a map of the geographic location associates each roadway of the one or more roadways with an indication of whether an AV can travel on that roadway. In some non-limiting embodiments, features of a road are based on data collected by and/or received from one or more sensors located on an AV as the AV travels on one or more roads in a geographic location.

In some non-limiting embodiments, a road refers to a paved or otherwise improved path between two places that allows for travel by a vehicle (e.g., an AV). Additionally or alternatively, a road includes a roadway and a sidewalk in proximity to (e.g., adjacent, near, next to, touching, etc.) the roadway. In some non-limiting embodiments, a roadway includes a portion of road on which a vehicle is intended to travel and is not restricted by a physical barrier or by separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example a lane of a roadway is connected to another lane of the roadway and/or a lane of the roadway is connected to a lane of another roadway.

Referring now to FIG. 1, FIG. 1 is a diagram of a non-limiting embodiment of an environment 100 in which systems and/or methods, described herein, can be implemented. As shown in FIG. 1, environment 100 includes map generation system 102, autonomous vehicle 104, and network 106. Systems and/or devices of environment 100 can interconnect via wired connections, wireless connections, or a combination of wired and wireless connections.

In some non-limiting embodiments, map generation system 102 includes one or more devices capable of receiving map data, determining a driving path for an AV including one or more trajectories in a lane of the roadway based on one or more traversals of the roadway by one or more vehicles, generating driving path information based on one or more trajectory points in the one or more trajectories of the driving path in the roadway, and/or providing driving path data associated with the driving path for controlling the autonomous vehicle 104. For example, map generation system 102 can include one or more computing systems including one or more processors (e.g., one or more servers, etc.).

In some non-limiting embodiments, autonomous vehicle 104 includes one or more devices capable of receiving driving path data and determining a route in a lane including a driving path based on the driving path data. In some non-limiting embodiments, autonomous vehicle 104 includes one or more devices capable of controlling travel, operation, and/or routing of autonomous vehicle 104 based on the driving path data. For example, the one or more devices may control travel and one or more functionalities associated with the fully autonomous mode of autonomous vehicle 104 in a lane on the driving path, based on the driving path information including feature information associated with the driving path, for example, by controlling the one or more devices (e.g., a device that controls acceleration, a device that controls steering, a device that controls braking, an actuator that controls gas flow, etc.) of autonomous vehicle 104 based on sensor data, position data, and/or map data associated with determining the features in the lane. In some non-limiting embodiments, autonomous vehicle 104 includes one or more devices capable of receiving map data, determining a route in a lane that includes the driving path for an autonomous vehicle 104, including one or more trajectories in a roadway based on one or more traversals of the roadway by one or more vehicles, generating driving path information based on one or more trajectory points in the one or more trajectories of the driving path in the roadway, and/or providing driving path data associated with the driving path for controlling the autonomous vehicle 104. For example, autonomous vehicle 104 can include one or more computing systems including one or more processors (e.g., one or more servers, etc.). Further details regarding non-limiting embodiments of autonomous vehicle 104 are provided below with regard to FIG. 2.

In some non-limiting embodiments, map generation system 102 and/or autonomous vehicle 104 include one or more devices capable of receiving, storing, and/or providing map data (e.g., map data, AV map data, coverage map data, hybrid map data, submap data, etc.) associated with a map (e.g., a map, a submap, an AV map, a coverage map, a hybrid map, etc.) of a geographic location (e.g., a country, a state, a city, a portion of a city, a township, a portion of a township, etc.). For example, maps are used for routing autonomous vehicle 104 on a roadway specified in the map.

In some non-limiting embodiments, network 106 includes one or more wired and/or wireless networks. For example, network 106 includes a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
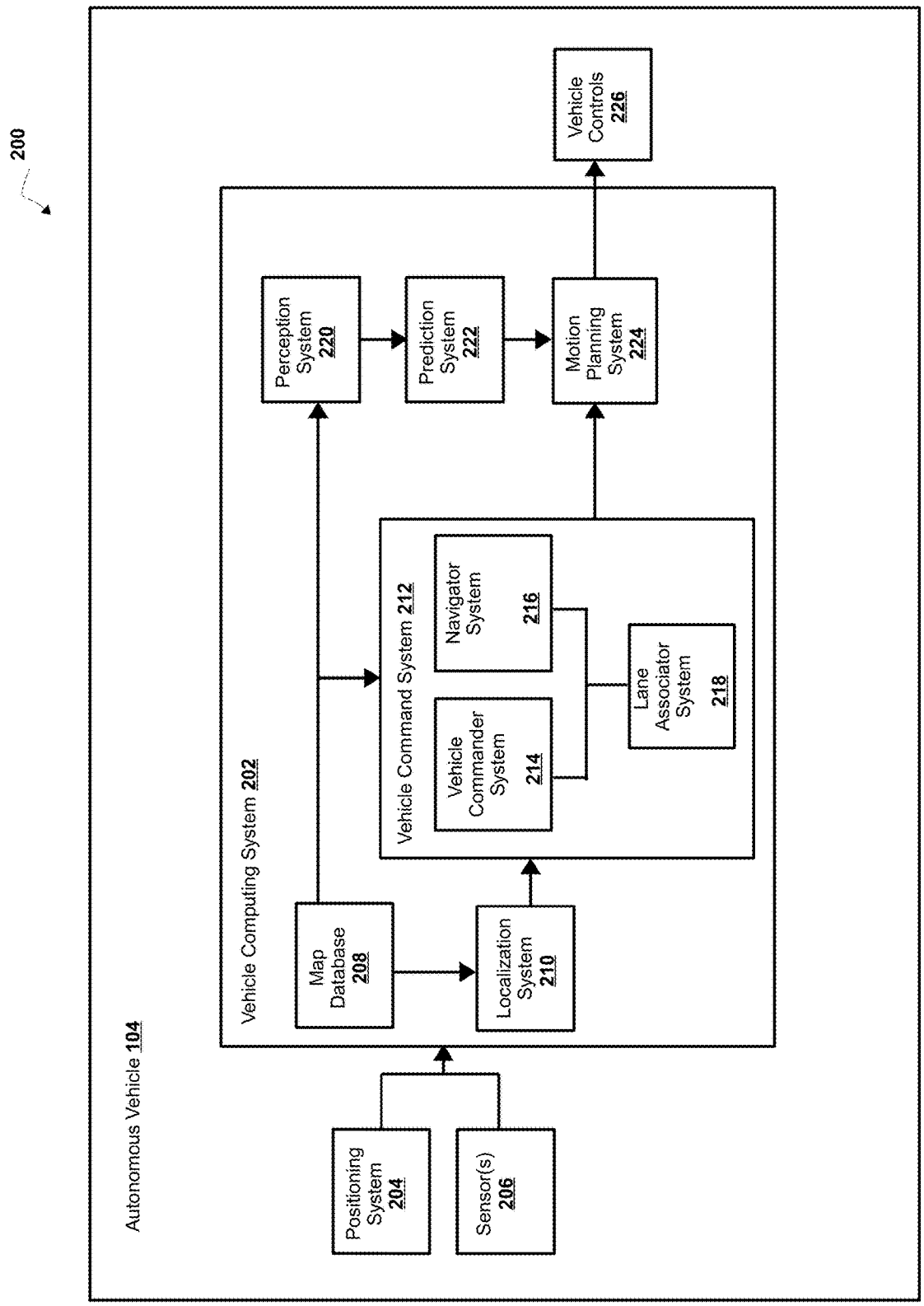
FIG. 2 is a diagram of a non-limiting embodiment of a system for controlling an AV shown in FIG. 1.

Referring now to FIG. 2, FIG. 2 is a diagram of a non-limiting embodiment of a system 200 for controlling autonomous vehicle 104. As shown in FIG. 2, vehicle computing system 202 includes vehicle command system 212, perception system 220, prediction system 222, and motion planning system 224 that cooperate to perceive a surrounding environment of autonomous vehicle 104, determine a motion plan and control the motion (e.g., the direction of travel) of autonomous vehicle 104 accordingly.

In some non-limiting embodiments, vehicle computing system 202 is connected to or includes positioning system 204. In some non-limiting embodiments, positioning system 204 determines a position (e.g., a current position, a past position, etc.) of autonomous vehicle 104. In some non-limiting embodiments, positioning system 204 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments, the position of autonomous vehicle 104 is used by vehicle computing system 202.

In some non-limiting embodiments, vehicle computing system 202 receives sensor data from one or more sensors 206 that are coupled to or otherwise included in autonomous vehicle 104. For example, one or more sensors 206 includes a Light Detection and Ranging (LIDAR) system, a Radio Detection and Ranging (RADAR) system, one or more cameras (e.g., visible spectrum cameras, infrared cameras, etc.), and/or the like. In some non-limiting embodiments, the sensor data includes data that describes a location of objects within the surrounding environment of the autonomous vehicle 104. In some non-limiting embodiments, one or more sensors 206 collect sensor data that includes data that describes a location (e.g., in three-dimensional space relative to the autonomous vehicle 104) of points that corresponds to objects within the surrounding environment of autonomous vehicle 104.

In some non-limiting embodiments, the sensor data includes a location (e.g., a location in three-dimensional space relative to the LIDAR system) of a number of points (e.g., a point cloud) that correspond to objects that have reflected a ranging laser. In some non-limiting embodiments, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments, map data includes LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments, the sensor data includes a location (e.g., a location in three-dimensional space relative to the RADAR system) of a number of points that correspond to objects that have reflected a ranging radio wave. In some non-limiting embodiments, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments, the RADAR system provides information about the location and/or the speed of an object relative to the RADAR system based on the radio waves.

In some non-limiting embodiments, image processing techniques (e.g., range imaging techniques, such as, for example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments, map database 208 provides detailed information associated with the map, features of the roadway in the geographic location, and information about the surrounding environment of the autonomous vehicle 104 for the AV to use while driving (e.g., traversing a route, planning a route, determining a motion plan, controlling the AV, etc.).

In some non-limiting embodiments, vehicle computing system 202 receives a vehicle pose from localization system 210 based on one or more sensors 206 that are coupled to or otherwise included in autonomous vehicle 104. In some non-limiting embodiments, the localization system 210 includes a LIDAR localizer, a low quality pose localizer, and/or a pose filter. For example, the localization system uses a pose filter that receives and/or determines one or more valid pose estimates (e.g., not based on invalid position data, etc.) from the LIDAR localizer and/or the low quality pose localizer, for determining a map-relative vehicle pose. For example, the low quality pose localizer determines a low quality pose estimate in response to receiving position data from positioning system 204 for operating (e.g., routing, navigating, controlling, etc.) the autonomous vehicle 104 under manual control (e.g., in a coverage lane). In some non-limiting embodiments, the LIDAR localizer determines a LIDAR pose estimate in response to receiving sensor data (e.g., LIDAR data, RADAR data, etc.) from sensors 206 for operating (e.g., routing, navigating, controlling, etc.) the autonomous vehicle 104 under autonomous control (e.g., in a coverage lane).

In some non-limiting embodiments vehicle command system 212 includes vehicle commander system 214, navigator system 216, and lane associator system 218 that cooperate to route and/or navigate the autonomous vehicle 104 in a geographic location. In some non-limiting embodiments, vehicle commander system 214 provides tracking of a current objective of the autonomous vehicle 104, including a current service, a target pose, and/or a coverage plan (e.g., development testing, etc.). In some non-limiting embodiments, navigator system 216 determines and/or provides a route plan for the autonomous vehicle 104 based on the current state of the autonomous vehicle 104, map data (e.g., lane graph, etc.), and one or more vehicle commands (e.g., a target pose). For example, navigator system 216 determines a route plan (e.g., plan, re-plan, deviation, etc.) including one or more lanes (e.g., current lane, future lane, etc.) in one or more roadways the autonomous vehicle 104 may traverse on a route to a destination (e.g., target, trip drop-off, etc.).

In some non-limiting embodiments, navigator system 216 determines a route plan based on one or more lanes received from lane associator system 218. In some non-limiting embodiments, the lane associator determines one or more lanes of a route in response to receiving a vehicle pose from the localization system 210. For example, the lane associator 218 determines, based on the vehicle pose, that the AV is on a coverage lane, and in response to determining that the AV is on the coverage lane, determines one or more candidate lanes (e.g., routable lanes) within a distance of the vehicle pose associated with the autonomous vehicle 104. For example, the lane associator system 218 determines, based on the vehicle pose, that the autonomous vehicle 104 is on an AV lane, and in response to determining that the autonomous vehicle 104 is on the AV lane, determines one or more candidate lanes (e.g., routable lanes) within a distance of the vehicle pose associated with the autonomous vehicle 104. In some non-limiting embodiments, navigator system 216 generates a cost function for each of one or more candidate lanes the autonomous vehicle 104 may traverse on a route to a destination. For example, navigator system 216 generates the cost function that describes a cost (e.g., a cost over a time period) of following (e.g., adhering to) one or more lanes to reach a target pose.

In some non-limiting embodiments, perception system 220 detects and/or tracks objects (e.g., vehicles, pedestrians, bicycles, and/or the like) that are proximate to (e.g., in proximity to the surrounding environment of) the autonomous vehicle 104 over a time period. In some non-limiting embodiments, perception system 220 can retrieve (e.g., obtain) map data from map database 208 that provides detailed information about the surrounding environment of the autonomous vehicle 104.

In some non-limiting embodiments, perception system 220 determines one or more objects that are proximate to autonomous vehicle 104 based on sensor data received from one or more sensors 206 and/or map data from map database 208. For example, perception system 220 determines, for the one or more objects that are proximate, state data associated with a state of such object. In some non-limiting embodiments, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments, perception system 220 determines state data for an object over a number of iterations of determining state data. For example, perception system 220 updates the state data for each object of a plurality of objects during each iteration.

In some non-limiting embodiments, prediction system 222 receives the state data associated with one or more objects from perception system 220. Prediction system 222 predicts one or more future locations for the one or more objects based on the state data. For example, prediction system 222 predicts the future location of each object of a plurality of objects within a time period (e.g., 5 seconds, 10 seconds, 20 seconds, etc.). In some non-limiting embodiments, prediction system 222 predicts that an object will adhere to the object's direction of travel according to the speed of the object. In some non-limiting embodiments, prediction system 222 uses machine learning techniques or modeling techniques to make a prediction based on state data associated with an object.

In some non-limiting embodiments, motion planning system 224 determines a motion plan for autonomous vehicle 104 based on a prediction of a location associated with an object provided by prediction system 222 and/or based on state data associated with the object provided by perception system 220. For example, motion planning system 224 determines a motion plan (e.g., an optimized motion plan) for the autonomous vehicle 104 that causes autonomous vehicle 104 to travel relative to the object based on the prediction of the location for the object provided by prediction system 222 and/or the state data associated with the object provided by perception system 220.

In some non-limiting embodiments, motion planning system 224 receives a route plan as a command from the navigator system 216. In some non-limiting embodiments, motion planning system 224 determines a cost function for each of one or more motion plans of a route for autonomous vehicle 104 based on the locations and/or predicted locations of one or more objects. For example, motion planning system 224 determines the cost function that describes a cost (e.g., a cost over a time period) of following (e.g., adhering to) a motion plan (e.g., a selected motion plan, an optimized motion plan, etc.). In some non-limiting embodiments, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments, motion planning system 224 determines a cost of following a motion plan. For example, motion planning system 224 determines a motion plan for autonomous vehicle 104 based on one or more cost functions. In some non-limiting embodiments, motion planning system 224 determines a motion plan (e.g., a selected motion plan, an optimized motion plan, a preferred motion plan, etc.) that minimizes a cost function. In some non-limiting embodiments, motion planning system 224 provides a motion plan to vehicle controls 226 (e.g., a device that controls acceleration, a device that controls steering, a device that controls braking, an actuator that controls gas flow, etc.) to implement the motion plan.

Figure 3:
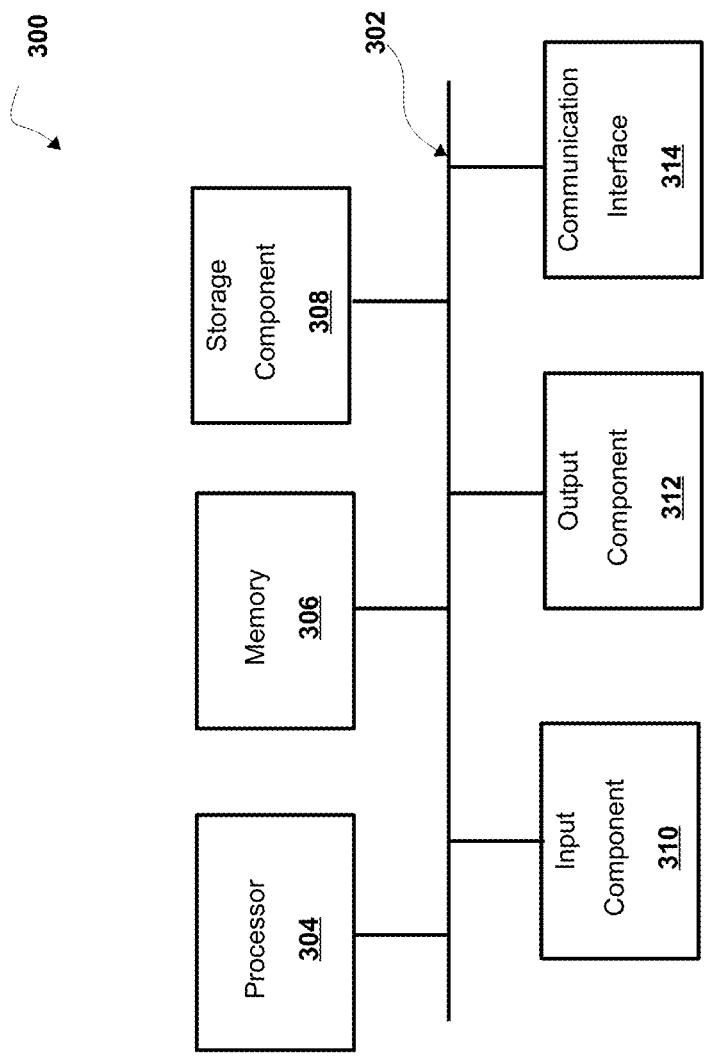
FIG. 3 is a diagram of a non-limiting embodiment of components of one or more devices of FIGS. 1 and 2.

Referring now to FIG. 3, FIG. 3 is a diagram of example components of a device 300. Device 300 can correspond to one or more devices of map generation system 102 and/or one or more devices (e.g., one or more devices of a system of) autonomous vehicle 104. In some non-limiting embodiments, one or more devices of map generation system 102 and/or one or more devices (e.g., one or more devices of a system of) autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
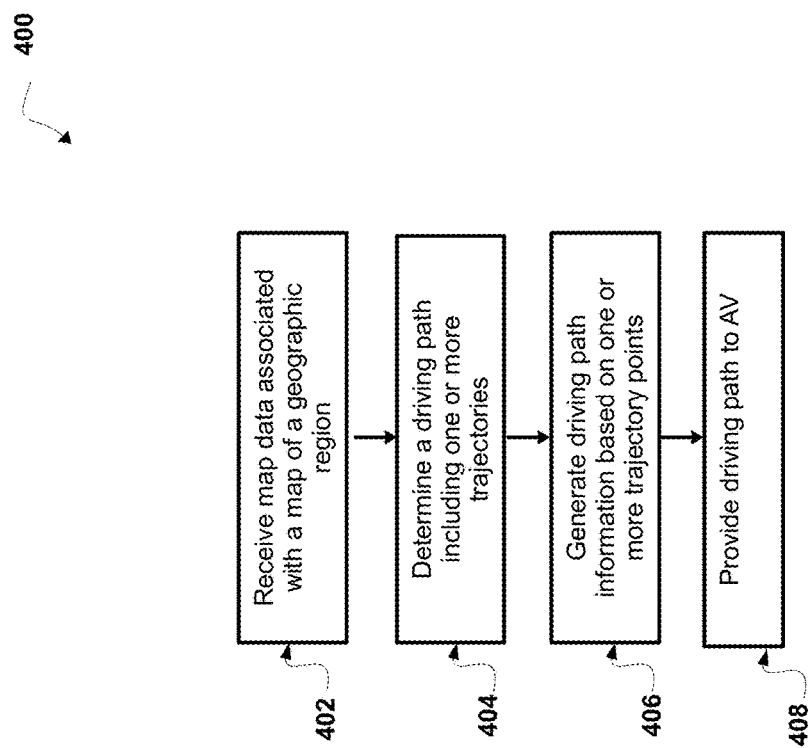
FIG. 4 is a flowchart of a non-limiting embodiment of a process for generating a driving path.

Referring now to FIG. 4, FIG. 4 is a flowchart of a non-limiting embodiment of a process 400 for generating a driving path. In some non-limiting embodiments, one or more of the steps of process 400 are performed (e.g., completely, partially, etc.) by map generation system 102 (e.g., one or more devices of map generation system 102). In some non-limiting embodiments, one or more of the steps of process 400 are performed (e.g., completely, partially, etc.) by another device or a group of devices separate from or including map generation system 102, such as autonomous vehicle 104 (e.g., one or more devices of autonomous vehicle 104).

As shown in FIG. 4, at step 402, process 400 includes receiving map data associated with a map of a geographic location. In some non-limiting embodiments, map generation system 102 receives map data associated with a map of a geographic location, wherein the map data is associated with a roadway in the geographic location.

In some non-limiting embodiments, map data includes data associated with a road (e.g., an identity and/or a location of a roadway of a road, an identity and/or location of a segment of a road, etc.), data associated with an object in proximity to a road (e.g., a curb of the road, a building, a lamppost, a crosswalk, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, road edge markings, traffic signs, traffic lights, etc.), and/or the like. In some non-limiting embodiments, a map of a geographic location includes one or more roadways that include one or more lanes to route an autonomous vehicle 104.

In some non-limiting embodiments, a road refers to a paved or otherwise improved path between two places that allows for travel by a vehicle (e.g., autonomous vehicle 104). Additionally, or alternatively, a road includes a roadway and a sidewalk in proximity to (e.g., adjacent, near, next to, touching, etc.) the roadway. In some non-limiting embodiments, a roadway includes a portion of road on which a vehicle is intended to travel and is not restricted by a physical barrier or by separation so that the vehicle is able to travel laterally. Additionally, or alternatively, a roadway (e.g., one or more roadway segments) includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example a lane of a roadway is connected to another lane of the roadway and/or a lane of the roadway is connected to a lane of another roadway.

In some non-limiting embodiments, a roadway is associated with map data (e.g., map data, AV map data, coverage map data, hybrid map data, submap data, route data, etc.) that defines one or more attributes of (e.g., metadata associated with) the roadway (e.g., attributes of a roadway in a geographic location, attributes of a segment of a roadway, attributes of a lane of a roadway, attributes of an edge of a roadway, etc.). In some non-limiting embodiments, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

In some non-limiting embodiments, a lane (and/or a roadway segment or extent) includes one or more ends. For example, an end of a lane (and/or a roadway segment or extent) is associated with or corresponds to a geographic location at which map data associated with the lane (and/or the roadway segment or extent) ends (e.g., is unavailable). As an example, an end of a lane can correspond to a geographic location at which map data for that lane ends.

In some non-limiting embodiments, the map data includes a link (e.g., a connection) that connects or links a lane (and/or a roadway segment or extent) to another lane (and/or to another roadway segment or extent). As an example, the map data includes a unique identifier for each lane (and/or roadway segment or extent), and the unique identifiers are associated with one another in the map data to indicate a connection or link of a lane to another lane (or a connection or link of a roadway segment or extent to another roadway segment or extent). For example, the unique identifiers can be associated with one another in the map data to indicate that a lane (and/or a roadway segment or extent) is a predecessor lane or a successor lane to another lane (and/or a predecessor or successor roadway segment or extent to another roadway segment or extent). As an example, a heading of travel (e.g., direction) of a predecessor lane to another lane is from the predecessor lane to the another lane, and a heading of travel of a successor lane to another lane is from the another lane to the successor lane.

As shown in FIG. 4, at step 404, process 400 includes determining a driving path including one or more trajectories. In some non-limiting embodiments, map generation system 102 determines a driving path including one or more trajectories for an AV in a roadway based on one or more traversals of the roadway by one or more vehicles. For example, map generation system 102 may determine a driving path in the roadway to represent an indication of a centerline path in at least one lane of the roadway for controlling the autonomous vehicle 104 during operation (e.g., follow) on the driving path. As an example, map generation system 102 determines the centerline path based on the lane markings on the road and/or based on one or more traversals of the roadway by one or more vehicles and/or a determination of where a vehicle will drive in a lane of the roadway. In some non-limiting embodiments, map generation system 102 determines a driving path that includes feature information based on features of the roadway (e.g., section of curb, marker, object, etc.) for controlling an autonomous vehicle 104 to autonomously determine objects in the roadway. For example, map generation system 102 determines a driving path that includes the left and right edges of a lane in the roadway; in this way, map generation system 102 determines a driving path to control the autonomous vehicle 104 in a roadway that includes a position of features (e.g., a portion of the feature, a section of the feature) in the roadway, while road edges and control measures may remain unchanged. As an example, map generation system 102 determines a driving path including feature information associated with lateral regions, for example, by determining the features of the roadway in the lateral regions. In some non-limiting embodiments, map generation system 102 determines an entry point and end point of the driving path that is associated with entry information and/or end (e.g., exit) information for traversing the driving path, the entry and/or end information comprising at least one of heading information, curvature information, and acceleration information of the driving path.

In some non-limiting embodiments, map generation system 102 may determine a driving path in a lane in the geographic location that includes a first trajectory (e.g., a spline, a polyline, etc.); as an example, map generation system 102 determines a single trajectory for a driving path in the roadway and/or a plurality of trajectories (e.g., a spline, a polyline, etc.) for a driving path in the roadway. As an example, map generation system 102 determines at least one trajectory of a driving path based on features in the roadway and/or traversals of the roadway by one or more vehicles (e.g., straightaways where paint lines are present, straight through intersections, straightaways where paint lines are not present, placement informed by average vehicle paths data, etc.) and/or the like. In some non-limiting embodiments, map generation system 102 determines a trajectory for a driving path based on information obtained from a vehicle (e.g., autonomous vehicles, non-autonomous vehicles, etc.) representing a path in the roadway. For example, map generation system 102 may obtain information for determining a driving path based on one or more trajectories of the roadway associated with one or more traversals of the roadway by one or more vehicles (e.g., autonomous vehicles, non-autonomous vehicles, etc.), a number of traversals of the roadway by one or more vehicles, a position of the vehicle associated with one or more traversals, interventions associated with one or more traversals of the roadway by one or more vehicles, a number of objects (e.g., a number of hazards, a number of bicycles, a railway track in proximity to the roadway, etc.) associated with one or more traversals of the roadway by one or more vehicles, a distance and/or position (e.g., a vehicle pose, an average distance to a vehicle pose, a mileage, etc.) associated with one or more traversals of the roadway by one or more vehicles (e.g., a distance until a detection of an event, a distance until detection of a potentially harmful or a harmful event to an AV, to a rider of the AV, to a pedestrian, a distance between a first detection of an event and a second detection of an event, miles per event, etc.), one or more traffic controls of the roadway associated with one or more traversals of the roadway by one or more AVs, one or more aspects of the roadway (e.g., a dimension of one or more lanes of the roadway, a width of one or more lanes of the roadway, a number of bicycle lanes of the roadway, etc.) associated with one or more traversals of the roadway by one or more AVs, a speed of one or more AVs associated with one or more traversals of the roadway by the one or more AVs, and/or the like.

In some non-limiting embodiments, map generation system 102 determines a single trajectory for at least one lane in the roadway and/or a driving path based on information including LIDAR point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments, map generation system 102 including a driving path that includes a primary path in the driving path, the primary path including a first trajectory of the driving path. For example, map generation system 102 determines a primary path in the driving path by identifying that the primary path satisfies a threshold indicating a driving path for controlling the autonomous vehicle 104 in an autonomous mode. For example, the primary path is based on information indicating a path for an autonomous vehicle 104 to autonomously follow. In some non-limiting embodiments, map generation system 102 determines a secondary path in the driving path. For example, map generation system 102 determines a secondary path identifying a trajectory in the driving path that may not satisfy a threshold indicating a driving path for controlling the autonomous vehicle 104 to traverse the path autonomously (lanes where a driving path does not need to be clearly defined, turning lanes in intersections, defined turns in intersections, diverging/converging lanes, etc.).

For example, map generation system 102 determines a secondary driving path that autonomous vehicle 104 cannot operate on (e.g., drive) under the fully-autonomous mode. For example, map generation system 102 determines the secondary path in the driving path as an estimate of where an autonomous vehicle 104 may drive.

In some non-limiting embodiments, map generation system 102 determines a driving path linking a first and a second driving path (e.g., a primary path to a primary path, a primary path to a secondary path, a secondary path to a primary path, etc.). For example, the first trajectory and second trajectory in the primary path each include an end point that is linked (e.g., logically connected) by the map generation system. In an example, the map generation system 102 determines a link for the first trajectory based on attributes of the point (e.g., an entry point of the trajectory, an end point of the trajectory), for example a position of a point, a heading of the trajectory at a point, an acceleration at a point (e.g., an entry point of the trajectory, an end point of the trajectory), and/or a curvature at a point (e.g., an entry point of the trajectory, an end point of the trajectory), and/or the like. For example, map generation system 102 determines a driving path that includes a first trajectory in a primary path linked to a second trajectory in a primary path, as a predecessor driving path (e.g., trajectory) to a successor driving path (e.g., trajectory), the link having continuity to generate the logical connection between the primary and secondary lane, in this way, providing continuity for one or more of a position of the endpoint, a heading of the trajectory at the end point, an acceleration at the end point, and a curvature at the end point. In some non-limiting embodiments, map generation system 102 determines a link (e.g., logical connection) including continuity of a heading and/or a curvature associated with an entry point of the secondary path in the driving path for the heading and curvature associated with an end point of the primary path. In another example, map generation system 102 determines a link (e.g., logical connection) that includes continuity of a heading and/or a curvature associated with an entry point of the primary path in the driving path to the heading and curvature associated with an end point of the secondary path. In some non-limiting embodiments, map generation system 102 may determine a primary driving path to include not more than one predecessor primary driving path linked to one successor primary driving path. In some non-limiting embodiments, map generation system 102 determines continuity to provide a transition between a first driving path and a second driving path. In some non-limiting embodiments, map generation system 102 determines a link between a first point and a second point, based on one or more attributes, for example, to provide logical connections to enhance the transition (e.g., smooth) across the link.

In some non-limiting embodiments, map generation system 102 determines a point (e.g., an entry point, an end point) of a first primary path that is not linked to a driving path. For example, map generation system 102 determines, based on map data, a lane that includes a primary path that is not linked to a driving path in the map (e.g., a successor driving path, a predecessor driving path), or determines in response to receiving a driving path in a lane, that the received driving path in a lane is not linked to a driving path in the map. In some non-limiting embodiments, map generation system 102 determines a point (e.g., an entry point, an end point) for a first primary driving path that is not linked to a point for a second driving path (e.g., primary, secondary) of the roadway. In some non-limiting embodiments, map generation system 102 determines the position of a point, for example, determining the point of the first primary driving path in a position that corresponds to the entry point of the second primary path. In some non-limiting embodiments, the map generation system determines a point (e.g., end point, entry point) in the secondary driving path, based on the point (e.g., end point, entry point) in the primary path that is not linked to a driving path. In some non-limiting embodiments, the map generation system 102 determines a point that corresponds to the end point of a secondary driving path, based on the entry point in a primary driving path by determining a threshold for a logical connection of the points (e.g., degree of continuity), for example, to provide one or more of a specified (e.g., pre-determined) heading, acceleration, curvature, and/or the like. In some non-limiting embodiments, map generation system 102 determines a link from the end point of the first primary path (e.g., trajectory) and the entry point of the second primary path (e.g., trajectory), for example, based on position, heading, acceleration, curvature, and/or the like.

As shown in FIG. 4, at step 406, process 400 includes generating driving path information based on one or more trajectory points. In some non-limiting embodiments, map generation system 102 generates driving path information based on one or more trajectory points of the one or more trajectories of the driving path in the roadway. For example, map generation system 102 generates driving path information for determining one or more features of the roadway to the left and right of the driving path. In some non-limiting embodiments, map generation system 102 determines feature information based on at least one feature (e.g., section of curb, marker, object, etc.) of the roadway positioned a lateral distance from a trajectory of the driving path based on the map data. In some non-limiting embodiments, map generation system 102, in response to determining the at least one feature of the roadway, determines a lateral constraint (e.g., a limit for vehicle travel) in the roadway based on at least the lateral distance of the at least one feature of the roadway from the first trajectory. In an example, the lateral constraint is associated with at least one lateral movement of an AV traversing the driving path on the roadway. For example, map generation system 102 generates one or more edge intersections (e.g., the objects to the left and the right of the road). For example, map generation system 102 generates one or more edge intersections for controlling an autonomous vehicle 104. For example, map generation system 102 generates one or more edge intersections to determine lateral objects located a distance from the driving path of the autonomous vehicle 104 (e.g., left movement, right movement). For example, map generation system 102 generates one or more edge intersections for controlling an autonomous vehicle 104 to determine a distance to a harmful event (e.g., safe movement, movement into another lane, movement to the curb, etc.).

In some non-limiting embodiments, map generation system 102 generates driving path information based on a set of orthogonal intersection samples (e.g., a subsection) along the driving path. For example, the driving path samples may include intersections with features in the roadway (e.g., real objects, paint markers, curbs, other lane paths) generated using the intersection of a lateral region (e.g., polygon) projecting from the path, that includes objects of interest. In some non-limiting embodiments, map generation system 102 generates lateral regions (e.g., one meter) that include edges formed of orthogonal lines from the path at an interval. In some non-limiting embodiments, the interval may be adjusted to extend the interval. In some non-limiting embodiments, the lateral regions will extend to a threshold distance, for example, a distance based on the road edge and/or features in the roadway. For example, map generation system 102 generates a lateral region on the left side and the right side of a driving path. As an example, map generation system 102 generates a first lateral region and a second lateral region, the right edge of the first lateral region polygon will be the left edge of second lateral region, in this way, the lateral regions include no spacing (e.g., gaps) between the lateral regions. In some non-limiting embodiments, map generation system 102 generates lateral regions with spacing, for example staggered lateral regions, skipping an interval, staggered left and right, and/or the like.

Further details regarding step 406 of process 400 are provided below with regard to FIG. 5.

As shown in FIG. 4, at step 408, process 400 includes providing driving path data associated with the driving path for controlling an AV. For example, map generation system 102 provides (e.g., transmits) driving path data associated with a driving path to an autonomous vehicle 104.

Further details regarding step 406 of process 400 are provided below with regard to FIG. 6.

Although FIG. 4 shows example blocks of process 400, in some implementations, process 400 may include additional blocks, fewer blocks, different blocks, or different arranged blocks than those depicted in FIG. 4. Additionally or alternatively, two or more of the blocks of process 400 may be performed in parallel.

Figure 5:
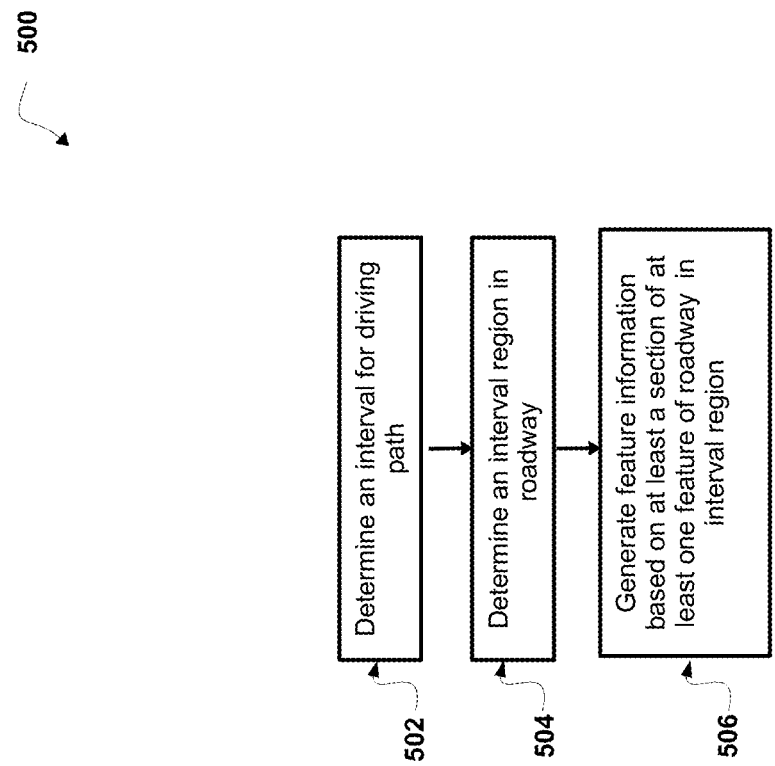
FIG. 5 is a flowchart of a non-limiting embodiment of a process for generating a driving path.

Referring now to FIG. 5, FIG. 5 is a flowchart of a non-limiting embodiment of a process 500 for determining at least one feature of the roadway orthogonal to the driving path. In some non-limiting embodiments, one or more of the steps of process 500 are performed (e.g., completely, partially, etc.) by map generation system 102 (e.g., one or more devices of map generation system 102). In some non-limiting embodiments, one or more of the steps of process 500 are performed (e.g., completely, partially, etc.) by another device or a group of devices separate from or including map generation system 102, such as autonomous vehicle 104 (e.g., one or more devices of autonomous vehicle 104).

As shown in FIG. 5, at step 502, process 500 includes determining an interval for the driving path associated with selecting a first set of points in the first trajectory of the driving path. For example, map generation system 102 determines points along the driving path at an interval or distance (e.g., one centimeter, one meter) for determining features in the roadway associated with the driving path.

As further shown in FIG. 5, at step 504, process 500 includes determining a lateral region in the roadway based on the map data associated with a location (e.g., polygon) including a distance between a first set of edges of the first set of trajectory points, each edge of the first set of edges including an orthogonal projection from a point of the first set of trajectory points in the first trajectory. For example, map generation system 102 determines a lateral region in the roadway based on the map data associated with a distance between a first set of edges of the first set of trajectory points and a distance from each edge of an orthogonal projection. In some non-limiting embodiments, map generation system 102 determines a first set of edges including to determine an orthogonal projection from the first set of trajectory points in the first trajectory. In some non-limiting embodiments, map generation system 102 determines a lateral region laterally on the left side and the right side of the first trajectory. In some non-limiting embodiments, map generation system 102 determines edge intersections orthogonal to the driving path to a maximum distance (e.g., sample distance) based on a fixed, dynamic, or curvature of the driving path, or alternatively, to a feature in the roadway (e.g., curb).

As further shown in FIG. 5, at step 506, process 500 includes generating feature information based on at least a portion of the at least one feature of the roadway having a location in the lateral region a lateral distance from the driving path. For example, map generation system 102 generates feature information based on at least a portion of the at least one feature (e.g., curbs, markers, objects) of the roadway having a location in the lateral region a lateral distance from the driving path.

In some non-limiting embodiments, map generation system 102 generates feature information (e.g., a list of intersection points of the orthogonal projection). For example, map generation system 102 may determine feature information (e.g., an element) that includes an orthogonal intersection point (e.g., edge intersection point) in the lateral region for a portion of a feature in the roadway (e.g., section of curb, marker, object, other driving paths, etc.) a lateral distance from a driving path. As an example, map generation system 102 may determine feature information (e.g., for an element) that includes more than one orthogonal intersection point in the lateral region for each portion of a feature in the roadway (e.g., section of curb, marker, object, etc.) a lateral distance from a driving path. As an example, map generation system 102 may determine feature information (e.g., list of elements) that includes more than one orthogonal intersection point in the lateral region for each portion of a plurality of features in the roadway (e.g., section of curb, marker, object, other driving path, etc.) a lateral distance from a driving path, as an example, the feature information may include a minimum subset of points for each intersecting element which contains all the orthogonal intersection points. In some non-limiting embodiments, map generation system 102 may generate sorted feature information according to intersection projection order on the path. In some non-limiting embodiments, map generation system 102 determines feature information based on the orthogonal distance to the path of intersecting elements. For example, map generation system 102 generates feature information based on intersections of at least a portion of a feature of the roadway (e.g., curbs, markers, objects) on the left side and the right side of the driving path. In some non-limiting embodiments, map generation system 102 may store the feature information as driving path data associated with driving path information. For example, map generation system 102 generates driving path data that includes the intersection points for a lane.

In some non-limiting embodiments, map generation system 102 generates a continuous geometric element list for each lane of the continuous geometric elements (e.g., features in the roadway including a continuous set of orthogonal intersection points across the distance of at least one lane) including an orthogonal intersection with the driving path in the lane. The map generation system 102 may generate continuous geometric elements, for example, element lists, based on sections of features in a roadway (e.g., individual curbs, markers, objects, and other driving paths) that include each of the intersection points associated with the lane. In some non-limiting embodiments, map generation system 102 may generate a separate location for storing the continuous geometric elements from the orthogonal intersection points. In some non-limiting embodiments, map generation system 102 may generate for each element represented by any orthogonal intersection point, a minimum geometric interval containing these points. In some non-limiting embodiments, map generation system 102 may generate driving path data associated with continuous points (e.g., for a polyline, polygon, etc.) and element identification. In some non-limiting embodiments, map generation system 102 generates an element identification, based on a specific part of the driving path (e.g., left of trajectory, right of trajectory).

Although FIG. 5 shows example blocks of process 500, in some implementations, process 400 may include additional blocks, fewer blocks, different blocks, or differently arranged blocks than those depicted in FIG. 5. Additionally or alternatively, two or more of the blocks of process 400 may be performed in parallel.

Figure 6:
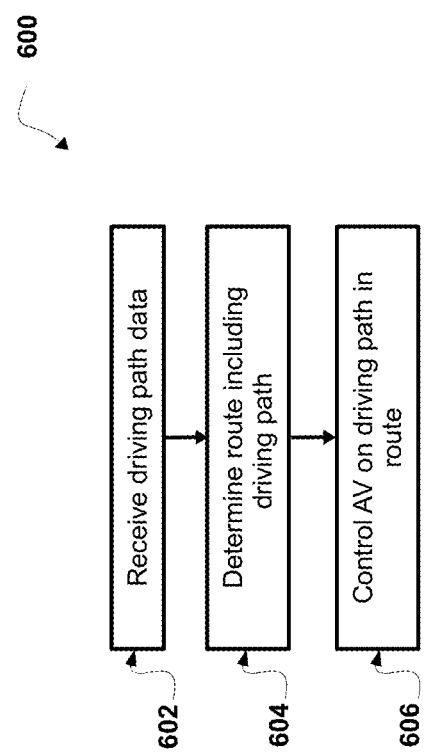
FIG. 6 is a flowchart of a non-limiting embodiment of a process for determining a driving path.

Referring now to FIG. 6, FIG. 6 is a flowchart of a non-limiting embodiment of a process 600 for generating a driving path. In some non-limiting embodiments, one or more of the steps of process 600 are performed (e.g., completely, partially, etc.) by autonomous vehicle 104 (e.g., one or more devices of autonomous vehicle 104). In some non-limiting embodiments, one or more of the steps of process 600 are performed (e.g., completely, partially, etc.) by another device or a group of devices separate from or including autonomous vehicle 104, such as, map generation system 102 (e.g., one or more devices of map generation system 102).

As shown in FIG. 6, at step 602, process 600 includes receiving driving path data associated with a driving path in a roadway of a geographic location. For example, autonomous vehicle 104 (e.g., vehicle computing system 202, etc.) receives driving path data associated with a driving path of a roadway in a geographic location from map generation system 102. In some non-limiting embodiments, the driving path data includes a driving path for an AV in a roadway that includes and/or represents an indication of a centerline path in at least one lane of the roadway for controlling the autonomous vehicle 104 during operation (e.g., following, traveling, traversing, routing, etc.) on the driving path. In some non-limiting embodiments, the driving path data includes feature information based on features of the roadway (e.g., section of curb, marker, object, etc.) for controlling an autonomous vehicle 104 to autonomously determine objects in the roadway, and a driving path that includes feature information for determining the left and right edges of a lane in the roadway. For example, the driving path data includes a driving path in a lane in the geographic location that includes a trajectory (e.g., a spline, a polyline, etc.), and a location of features (e.g., a portion of the feature, a section of the feature) in the roadway, with a link for transitioning between an entry point and an end point of the driving path based on at least one of heading information, curvature information, acceleration information and/or the like, and intersections with features in the roadway (e.g., real objects, paint markers, curbs, other lane paths) of a lateral region (e.g., polygon) projecting from the path, with objects of interest.

As further shown in FIG. 6, at step 604, process 600 includes determining a route, including a driving path of the roadway in the geographic location based on the driving path data. For example, autonomous vehicle 104 (e.g., vehicle computing system 202, etc.) determines a route based on the driving path including the trajectory and feature information based on features of the roadway (e.g., section of curb, marker, object, etc.) for controlling an autonomous vehicle 104 to autonomously determine objects in the roadway, for example the left and right edges of a lane in the roadway. In some non-limiting embodiments, vehicle computing system 202 receives a request for service, and the request for service is associated with request data associated with a pick-up location (or a current location) and a drop-off location in the geographic location, and vehicle computing system 202 determines a route based on the driving path between the pick-up location (or the current location) and the drop-off location in the geographic location.

As further shown in FIG. 6, at step 606, process 600 includes controlling the autonomous vehicle 104 on the route based on the driving path including one or more trajectories. For example, vehicle computing system 202 controls autonomous vehicle 104 on a driving path that includes a primary path in the driving path, the primary path including a first trajectory of the driving path. For example, the vehicle computing system 202 controls autonomous vehicle 104 on a primary path in the driving path by identifying the primary path that satisfies a threshold indicating a driving path for an autonomous vehicle 104 to autonomously travel. In some non-limiting embodiments, the vehicle computing system 202 controls the autonomous vehicle 104 to transition to a secondary path in the driving path on a trajectory based on an estimate of where an autonomous vehicle 104 may drive, and cannot operate under the fully-autonomous mode.

For example, vehicle computing system 202 controls autonomous vehicle 104 on a driving path including a first trajectory in a primary path linked to a second trajectory in the primary path. For example, the vehicle computing system 202 controls the autonomous vehicle 104 to transition from a predecessor driving path (e.g., trajectory) to a successor driving path (e.g., trajectory) on the link having continuity to generate the logical connection between the primary and secondary lane, in this way, providing continuity for one or more of a position of the endpoint, a heading of the trajectory at the end point, an acceleration at the end point, and a curvature at the end point. For example, the vehicle computing system 202 controls the AV to traverse a link (e.g., logical connection) including continuity of a heading and/or a curvature associated with an entry point of the secondary path in the driving path for the heading and curvature associated with the end point of the primary path. In another example, the vehicle computing system 202 controls the AV on a link (e.g., logical connection) including continuity of a heading and/or a curvature associated with an entry point of the primary path in the driving path to the heading and curvature associated with an end point of the secondary path.

For example, vehicle computing system 202 controls autonomous vehicle 104 on a driving path including lateral regions (e.g., one meter) associated with edges formed of orthogonal lines of the path at an interval. For example, the vehicle computing system 202 controls the autonomous vehicle 104 to traverse a driving path based on the lateral regions, and avoid an object located at a distance off the path based on the road edge and/or features in the roadway. For example, map generation system 102 controls the autonomous vehicle 104 based on the generated lateral region on the left side and the right side of a driving path. As an example, the vehicle computing system 202 controls the autonomous vehicle 104 to operate on the driving path, avoiding features in the roadway in a first lateral region and a second lateral region. As an example, vehicle computing system 202 controls travel and one or more functionalities associated with the fully autonomous mode of autonomous vehicle 104 on the driving path based on the feature information associated with the lateral regions, for example, by controlling one or more vehicle controls 226 (e.g., a device that controls acceleration, a device that controls steering, a device that controls braking, an actuator that controls gas flow, etc.) of autonomous vehicle 104 based on sensor data, position data, and/or the map data associated with determining the elements in the lateral region.

Although FIG. 6 shows example blocks of process 600, in some implementations, process 600 may include additional blocks, fewer blocks, different blocks, or differently arranged blocks than those depicted in FIG. 6. Additionally or alternatively, two or more of the blocks of process 600 may be performed in parallel.

Referring now to FIGS. 7A-7E, FIGS. 7A-7E are diagrams of an overview of a non-limiting embodiment of an implementation 700, relating to a process for generating a driving path. As shown in FIGS. 7A-7E, implementation 700 may include map generation system 702, autonomous vehicle 704, vehicle computing system 712, and vehicle controls 718. In some non-limiting embodiments, map generation system 702 may be the same or similar to map generation system 102. In some non-limiting embodiments, autonomous vehicle 704 may be the same or similar to autonomous vehicle 104. In some non-limiting embodiments, vehicle computing system 712 may be the same or similar to vehicle computing system 202. In some non-limiting embodiments, vehicle controls 718 may be the same or similar to vehicle controls 228.

Figure 7A:
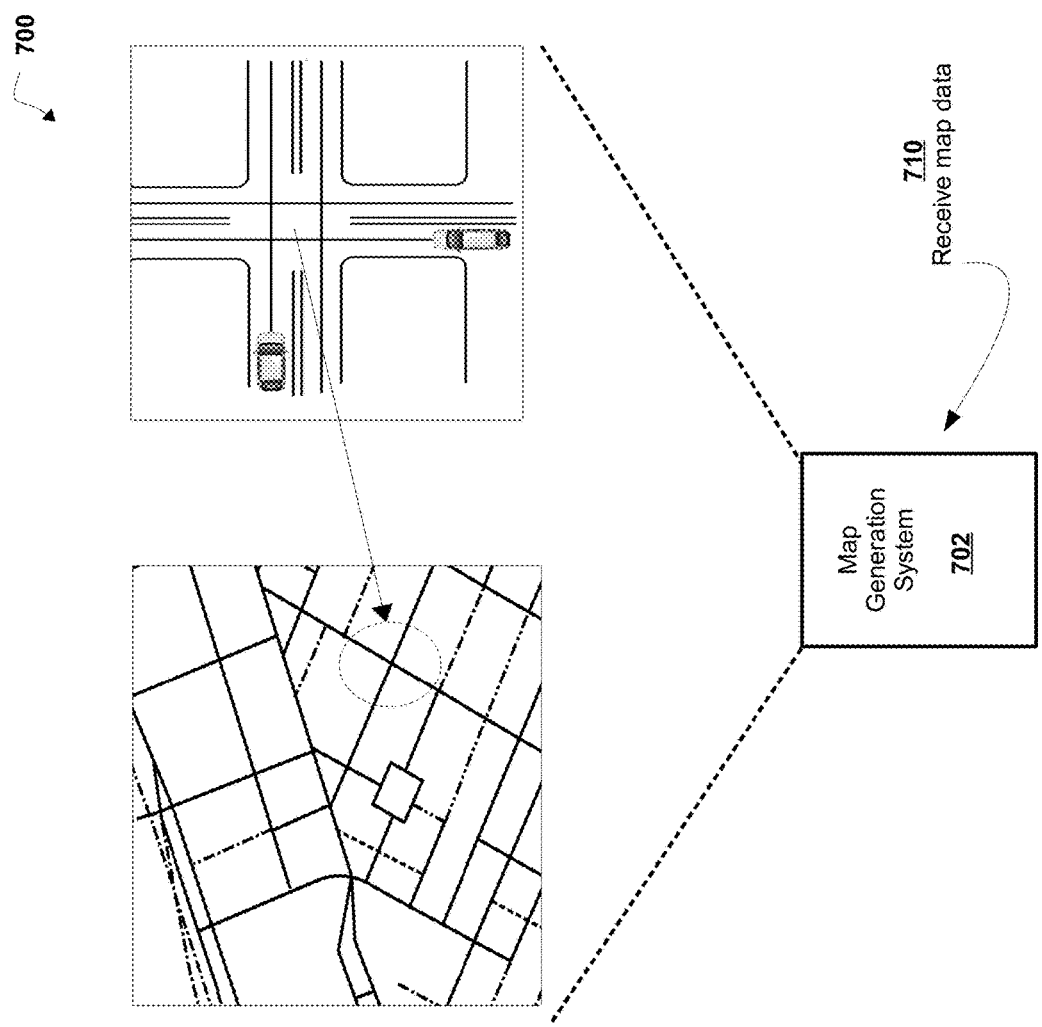
FIGS. 7A-7E are diagrams of an implementation of a non-limiting embodiment of a process disclosed herein.

As shown by reference number 710 in FIG. 7A, map generation system 702 receives AV map data associated with an AV map of a geographic location. For example, map generation system 702 can retrieve (e.g., obtain) the map data from one or more databases. As an example, FIG. 7A shows example AV lanes associated with example roadway segments or extents in an example AV map. In some non-limiting embodiments, an end of an AV lane is not linked to another AV lane in the AV map. In some non-limiting embodiments, a map of a geographic location includes one or more roadways that include one or more lanes to route an autonomous vehicle 704. In some non-limiting embodiments, a roadway is associated with map data (e.g., map data, AV map data, coverage map data, hybrid map data, submap data, route data, etc.) that defines one or more attributes of (e.g., metadata associated with) the roadway (e.g., attributes of a roadway in a geographic location, attributes of a segment of a roadway, attributes of a lane of a roadway, attributes of an edge of a roadway, etc.).

Figure 7B:
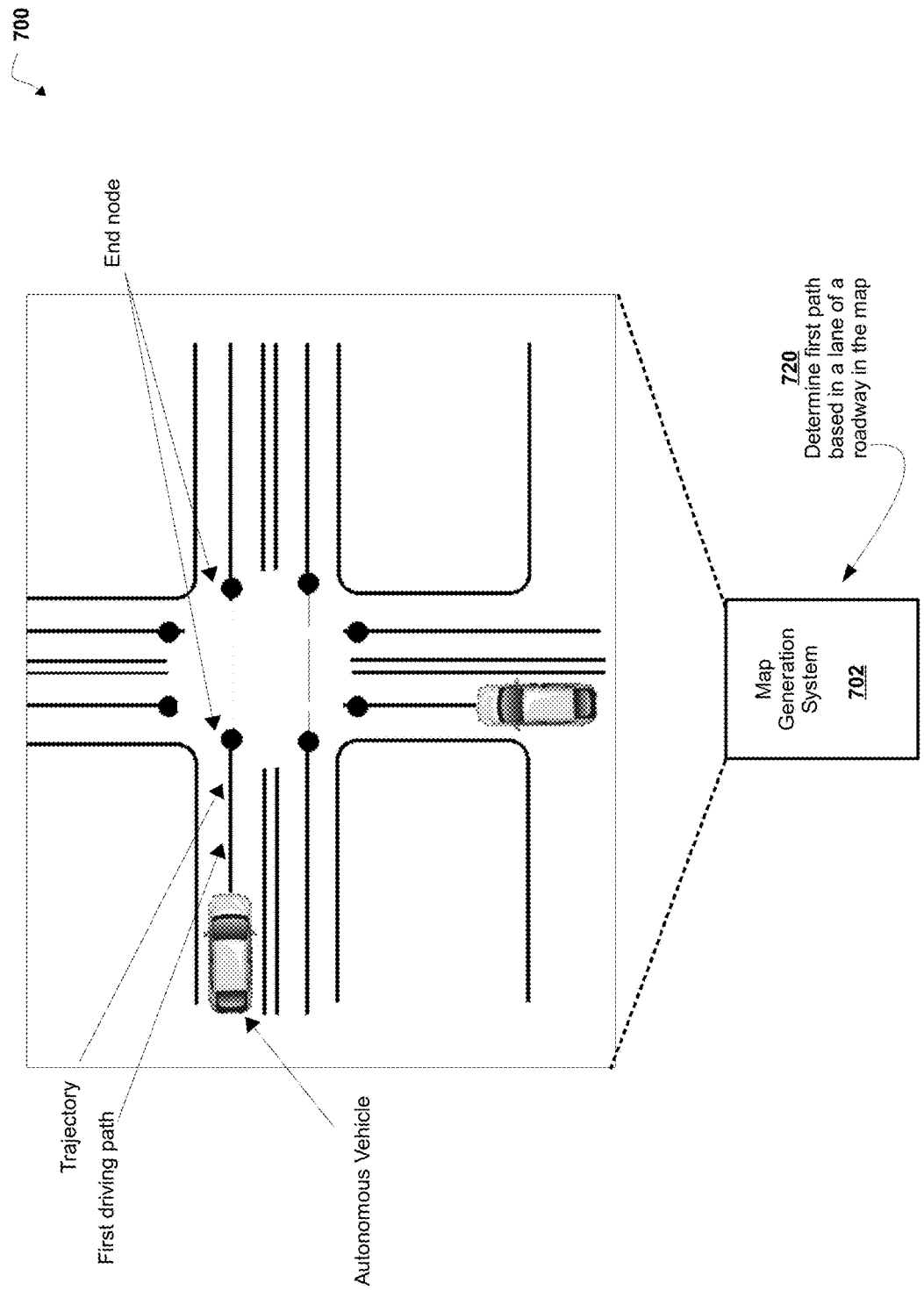

As shown by reference number 720 in FIG. 7B, map generation system 702 determines a first driving path in a lane of a roadway of a geographic location. For example, map generation system 702 determines a first driving path (e.g., straightaways where paint lines are present, straight through intersections, straightaways where paint lines are not present, placement informed by average vehicle paths data, placement informed by average vehicle paths data) with a point (e.g., an entry point, an end point) at an end of the first driving path. As shown, the path is determined based on previous traversals (e.g., by average vehicle paths data) and initially not linked to another driving path, for example, a second driving path in the map (e.g., a successor driving path, a predecessor driving path). In some non-limiting embodiments, map generation system 702 determines in response to receiving a driving path in a lane or a trajectory of a driving path in a lane, that the received driving path in a lane is not linked to a driving path in the map. For example, map generation system 702 determines in response to receiving a driving path in a lane or a trajectory of a driving path in a lane, a link to a driving path in the map. In some non-limiting embodiments, map generation system 702 determines a point (e.g., an entry point, an end point) for a first primary driving path that is not linked to a point to a second driving path (e.g., primary, secondary) of the roadway.

Figure 7C:
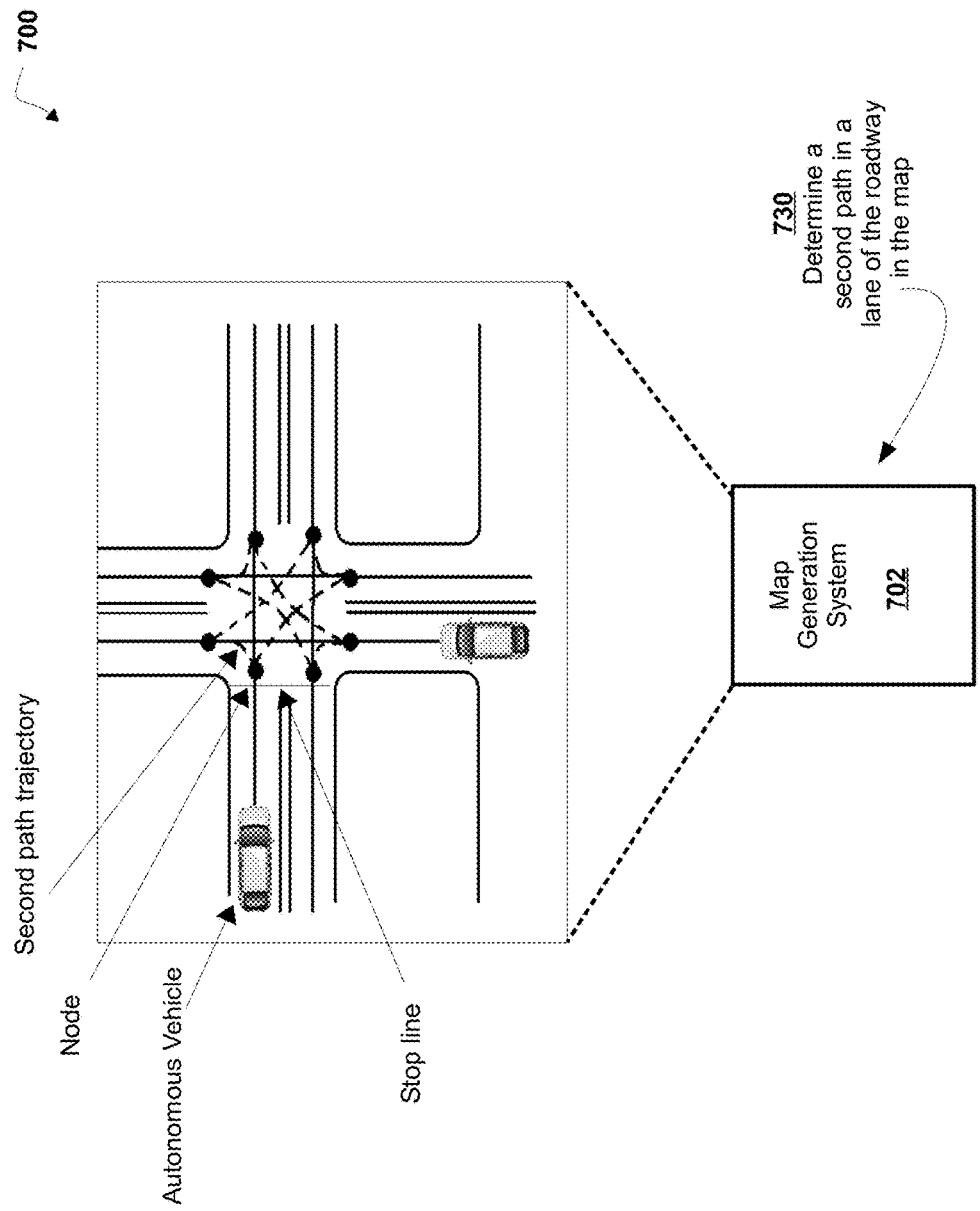

As shown by reference number 730 in FIG. 7C, map generation system 702 determines a second driving path in a lane of a roadway of a geographic location. As shown, in some non-limiting embodiments, map generation system 702 first determines a stop line and/or nodes (e.g., points) where a vehicle would come to a stop (e.g., natural stop, forced stop) in a roadway of a geographic location where the driving path may be defined and/or lateral movement is unrestricted. In some non-limiting embodiments, the map generation system determines a point (e.g., end point, entry point) in the second driving path based on the point (e.g., end point, entry point) in the first path that is not linked to a driving path. In some non-limiting embodiments, the map generation system 702 determines a point that corresponds to the end point of a second driving path based on the entry point in a first driving path by determining a threshold for a logical connection of the points (e.g., degree of continuity), for example, to provide one or more of a specified (e.g., pre-determined) heading, acceleration, curvature, and/or the like. In some non-limiting embodiments, map generation system 702 determines a link (e.g., logical connection) from the end point of the first driving path (e.g., trajectory) and the entry point of the second driving path (e.g., trajectory), for example, based on position, heading, acceleration, curvature, and/or the like. In some non-limiting embodiments, the second driving path may include a secondary driving path (e.g., lanes where a driving path does not need to be clearly defined, turning lanes in intersections, defined turns in intersections, diverging/converging lanes, etc.) linked to the first driving path including a primary path.

Figure 7D:
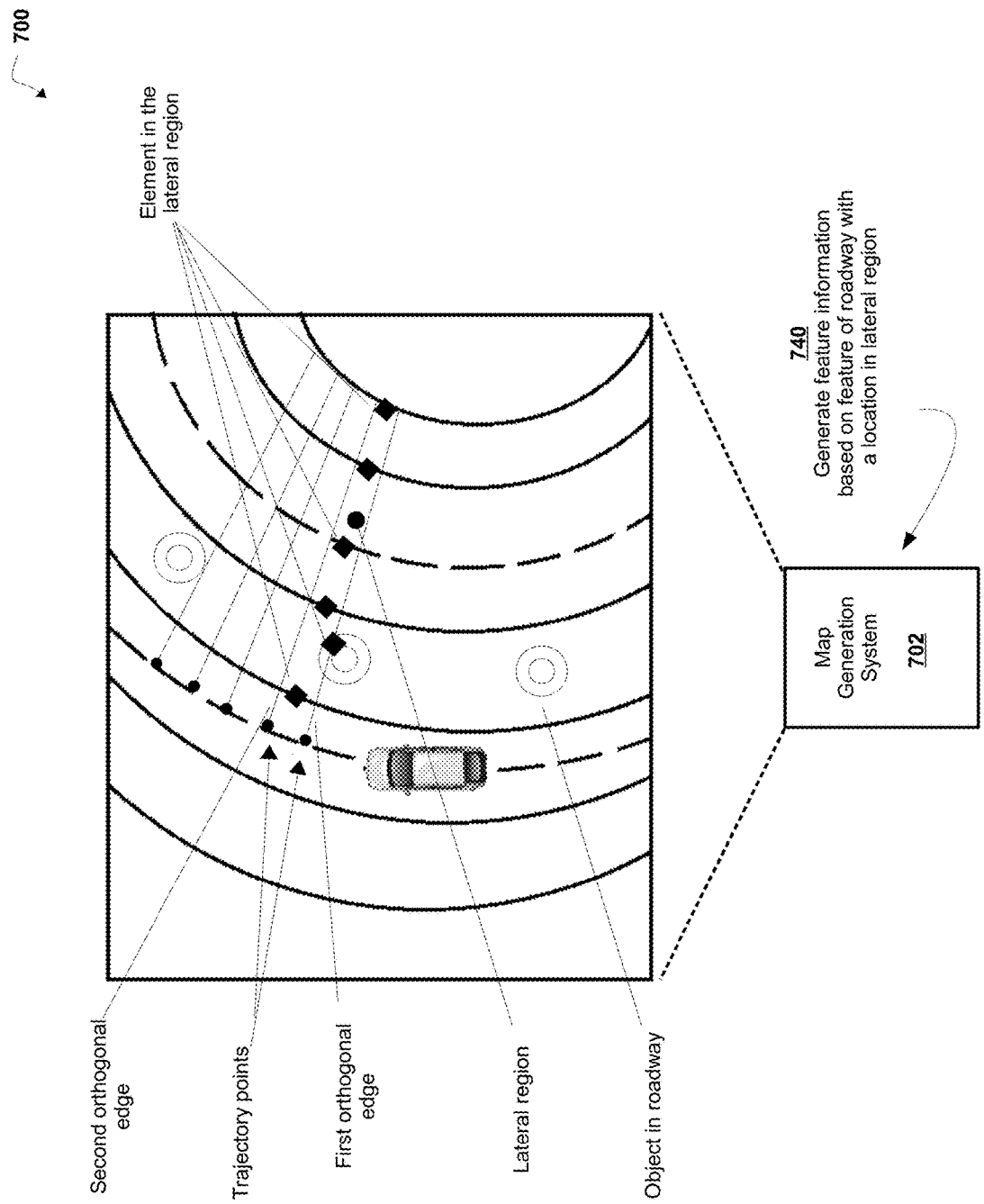

As shown by reference number 740 in FIG. 7D, map generation system 702 generates feature information based on a portion of a feature of the roadway with a location in the lateral region (e.g., elements in the lateral region). For example, map generation system 702 generates driving path information based on a set of orthogonal intersection samples (e.g., a subsection) along the driving path. As shown, map generation system 702 generates a lateral region based on a first and second orthogonal edge (e.g., lines) from a set of trajectory points of the driving path at an interval (e.g., one centimeter, one meter, etc.). For example, the lateral regions will extend to a distance, for example, a threshold distance based on the road edge. In some non-limiting embodiments, map generation system 702 generates a lateral region on the left side and the right side of the driving path. As shown, map generation system 702 generates a first lateral region and a second lateral region, the right edge of the first lateral region forming the left edge of the second lateral region, in this way, consecutive lateral regions (e.g., neighbors) include no spacing (e.g., gaps) between lateral regions. As shown, the first lateral region of the driving path includes intersections with features in the roadway (e.g., real objects, paint markers, curbs, other lane paths), that include a section of the right lane marker, a section of an object, a left lane marker of an adjacent lane, a driving path of the adjacent lane, a right lane marker of the adjacent lane, and a road edge marker of the roadway.

Figure 7E:
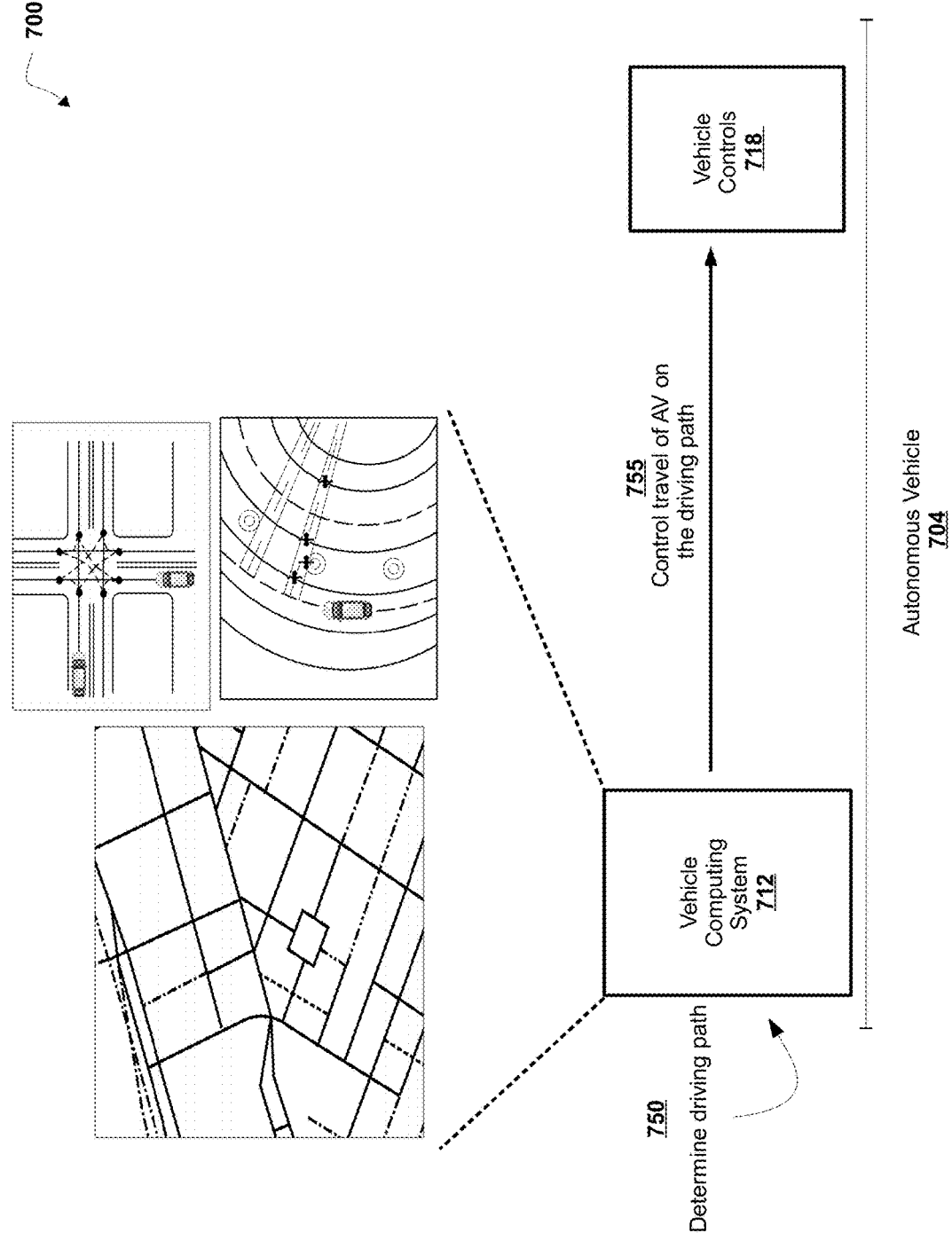

As shown by reference number 750 in FIG. 7E, vehicle computing system 712 of autonomous vehicle 704 determines a driving path including driving path information associated with one or more trajectories and feature information based on intersections of features of the roadway with the lateral regions of the roadway in the geographic location. For example, vehicle computing system 712 determines a driving path between a pick-up location (or a current location) and a drop-off location in the geographic location that includes a first trajectory (e.g., spline and/or polyline)

linked with a second trajectory based on map data associated with a map of the geographic location.

In some non-limiting embodiments, the vehicle computing system 712 determines a route, including one or more lanes of the roadway, each of the one or more lanes having a driving path in the geographic location based on the driving path data. For example, the vehicle computing system 712 determines a route including the driving path associated with the one or more trajectories and the feature information based on the features of the roadway (e.g., section of curb, marker, object, etc.) for controlling an autonomous vehicle 704 to autonomously determine objects in the roadway, for example objects in the left and right edges of the driving path in the roadway.

In some non-limiting embodiments, the vehicle computing system 712 determines a driving path for the autonomous vehicle 704 on the route based on the driving path including one or more trajectories. For example, vehicle computing system 712 controls autonomous vehicle 704 on a driving path that includes a primary path in the driving path (e.g., straightaways where paint lines are present, straight through intersections, straightaways where paint lines are not present, placement informed by average vehicle paths data, placement informed by average vehicle paths data, etc.) that includes a first trajectory. For example, the vehicle computing system 712 controls autonomous vehicle 704 on a primary path in the driving path by identifying the primary path that satisfies a threshold indicating a driving path for an autonomous vehicle 704 to autonomously travel. In some non-limiting embodiments, the vehicle computing system 712 controls the autonomous vehicle 704 to transition to a secondary path in the driving path based on a trajectory associated with an estimate of where an autonomous vehicle 704 may travel, for example, the autonomous vehicle 704 cannot travel on the trajectory under the fully-autonomous mode.

As shown by reference number 755 in FIG. 7E, vehicle computing system 712 controls operation and/or travel of autonomous vehicle 704 on the driving path based on the driving path data. For example, vehicle computing system 712 controls autonomous vehicle 704 to operate under the fully autonomous mode, the partially autonomous mode, and/or the manual mode on the driving path based on the driving path data. As an example, vehicle computing system 712 controls travel and one or more functionalities associated with the fully autonomous mode of autonomous vehicle 704 on the driving path based on the feature information associated with the lateral regions, for example, by controlling one or more vehicle controls 718 (e.g., a device that controls acceleration, a device that controls steering, a device that controls braking, an actuator that controls gas flow, etc.) of autonomous vehicle 704 based on sensor data, position data, and/or the map data associated with determining the elements in the lateral region. In some non-limiting embodiments, vehicle computing system 712 controls one or more functionalities associated with the autonomous mode or the manual mode of autonomous vehicle 704 when autonomous vehicle 704 is determining the objects in the lateral region of the driving path while on a route.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A computer-implemented method for determination of at least one driving path comprising:
receiving, with a computer system comprising one or more processors, map data associated with a map of a geographic location, wherein the map data is associated with a roadway in the geographic location;
determining, with the computing system, a driving path including one or more trajectories for an autonomous vehicle (AV) in the roadway based on one or more traversals of the roadway by one or more vehicles;
generating, with the computing system, driving path information based on one or more trajectory points in the one or more trajectories of the driving path in the roadway to determine at least one feature of the roadway positioned a lateral distance from a first trajectory of the one or more trajectories of the driving path based on the map data, by:
determining an interval for the driving path, the interval associated with selecting a first set of trajectory points in the first trajectory of the driving path;
determining a lateral region in the roadway based on the map data associated with a location between a first set of edges of the first set of trajectory points, each edge of the first set of edges including a lateral projection from a point of the first set of trajectory points in the first trajectory; and generating feature information based on at least a portion of the at least one feature of the roadway having a location in the lateral region a lateral distance from the driving path;

in response to determining the at least one feature of the roadway, determining a lateral constraint based on at least the lateral distance of the at least one feature of the roadway from the first trajectory, the lateral constraint associated with at least one lateral movement of the AV traversing the driving path on the roadway; and providing, with the computing system, driving path data associated with the driving path to the AV for controlling the AV on the roadway.

2. The computer-implemented method of claim 1, wherein determining a driving path further comprises:

identifying a primary path in the driving path, the primary path including a first trajectory of the one or more trajectories in the driving path, wherein the primary path satisfies a threshold indicating a driving path for controlling the AV in an autonomous mode.

3. The computer-implemented method of claim 2, further comprising:

identifying a secondary path in the driving path, the secondary path including a second trajectory of the one or more trajectories in the driving path, wherein the secondary path does not satisfy a threshold indicating a driving path for controlling the AV in the autonomous mode; and linking the primary path to the secondary path, wherein the first trajectory in the primary path is linked to the second trajectory in the secondary path.

4. The computer-implemented method of claim 3, wherein a heading and a curvature associated with an entry of the secondary path matches a heading and a curvature associated with an end of the primary path.

5. The computer-implemented method of claim 3, wherein determining a driving path further comprises:

determining an end point of a first primary path that is not linked to a driving path;

determining an entry point of a second primary path of the roadway associated with the end point of the first primary path that is not linked to a driving path;

determining a heading at the end point of the first primary path in the driving path that matches a heading at the entry point of the second primary path; and linking the end point of the first primary path to the entry point of the second primary path.

6. The computer-implemented method of claim 5, wherein the entry point of the driving path is associated with entry information for entering the primary path, the entry information comprising at least one of heading information, curvature information, and acceleration information of the driving path.

7. The computer-implemented method of claim 1, wherein the one or more trajectories of the driving path are associated with a spline, a polyline, or any combination thereof.

8. A computing system comprising:
one or more processors configured to:
receive map data associated with a map of a geographic location, wherein the map data is associated with a roadway in the geographic location;

determine a driving path including one or more trajectories for an AV in the roadway based on one or more traversals of the roadway by one or more vehicles;

generate driving path information based on one or more trajectory points in the one or more trajectories of the driving path in the roadway to determine at least one feature of the roadway positioned a lateral distance from a first trajectory of the one or more trajectories of the driving path based on the map data, by:

determining an interval for the driving path, the interval associated with selecting a first set of trajectory points in the first trajectory of the driving path;

determining a lateral region in the roadway based on the map data associated with a location between a first set of edges of the first set of trajectory points, each edge of the first set of edges including a lateral projection from a point of the first set of trajectory points in the first trajectory; and generating feature information based on at least a portion of the at least one feature of the roadway having a location in the lateral region a lateral distance from the driving path;

in response to determining the at least one feature of the roadway, determine a lateral constraint based on at least the lateral distance of the at least one feature of the roadway from the first trajectory, the lateral constraint associated with at least one lateral movement of the AV traversing the driving path on the roadway; and provide driving path data associated with the driving path to the AV for controlling the AV on the roadway.

9. The computing system of claim 8, when determining the driving path, further configured to:

identify a primary path in the driving path, the primary path including a first trajectory of the one or more trajectories in the driving path, wherein the primary path satisfies a threshold indicating a driving path for controlling the AV in an autonomous mode.

10. The computing system of claim 9, further configured to:

identify a secondary path in the driving path, the secondary path including a second trajectory of the one or more trajectories in the driving path, wherein the secondary path does not satisfy a threshold indicating a driving path for controlling the AV in the autonomous mode; and link the primary path to the secondary path, wherein the first trajectory in the primary path is linked to the second trajectory in the secondary path.

11. The computing system of claim 10, wherein a heading and a curvature associated with an entry of the secondary path matches a heading and a curvature associated with an end of the primary path.

12. The computing system of claim 8, when determining the driving path, wherein the one or more processors are further configured to:

determine an end point of a first primary path that is not linked to a driving path;

determine an entry point of a second primary path of the roadway associated with the end point of the first primary path that is not linked to a driving path;

determine a heading at the end point of the first primary path in the driving path that matches a heading at the entry point of the second primary path; and link the end point of the first primary path to the entry point of the second primary path.

13. The computing system of claim 12, wherein the entry point of the driving path is associated with entry information for entering the primary path, the entry information comprising at least one of heading information, curvature information, and acceleration information of the driving path.

14. The computing system of claim 8, wherein the one or more trajectories of the driving path are associated with a spline, a polyline, or any combination.

15. An autonomous vehicle (AV) comprising:
a vehicle computing system comprising one or more processors, wherein the vehicle computing system is configured to:
receive driving path data associated with a driving path in a roadway in a map of a geographic location, the driving path data including one or more trajectories that the AV can traverse in the roadway and an indication of the location of at least one feature in the roadway a lateral distance from the driving path;
generate driving path information based on one or more trajectory points in the one or more trajectories of the driving path in the roadway to determine at least one feature of the roadway positioned a lateral distance from a first trajectory of the one or more trajectories of the driving path based on the map data, by:
determining an interval for the driving path, the interval associated with selecting a first set of trajectory points in the first trajectory of the driving path;
determining a lateral region in the roadway based on the map data associated with a location between a first set of edges of the first set of trajectory points, each edge of the first set of edges including a lateral projection from a point of the first set of trajectory points in the first trajectory; and
generating feature information based on at least a portion of the at least one feature of the roadway having a location in the lateral region a lateral distance from the driving path;
in response to determining the at least one feature of the roadway, determine a lateral constraint based on at least the lateral distance of the at least one feature of the roadway from the first trajectory, the lateral constraint associated with at least one lateral movement of the AV traversing the driving path on the roadway; and
determine a route including the driving path of the roadway in the geographic location based on driving path information associated with the driving path.

16. The AV of claim 15 further comprising:
one or more sensors for detecting an object in an environment surrounding the AV, wherein the vehicle computing system is further configured to:
determine a vehicle operation based on the driving path data including the indication of the location of the at least one feature in the roadway a lateral distance from the driving path;
detect, based on the one or more sensors, that an object is in the roadway on the route; and
control travel of the AV on a first trajectory of the one or more trajectories of the driving path based on sensor data from the one or more sensors and the driving path data associated with the driving path.

* * * * *